United States Patent
Chosa

(10) Patent No.: US 7,432,963 B2
(45) Date of Patent: Oct. 7, 2008

(54) IMAGING APPARATUS

(75) Inventor: Takashi Chosa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1004 days.

(21) Appl. No.: 10/786,829

(22) Filed: Feb. 25, 2004

(65) Prior Publication Data

US 2004/0174442 A1    Sep. 9, 2004

(30) Foreign Application Priority Data

Mar. 4, 2003    (JP) ............................ 2003-057493

(51) Int. Cl.
*H04N 5/76* (2006.01)
*H04N 5/232* (2006.01)
*H04N 5/225* (2006.01)
(52) U.S. Cl. .............. 348/231.1; 348/231.2; 348/231.9; 348/211.6; 348/207.1
(58) Field of Classification Search .............. 348/231.1, 348/231.7, 231.9, 211.6
See application file for complete search history.

(56) References Cited

U.S. PATENT DOCUMENTS

| 5,473,370 | A | * | 12/1995 | Moronaga et al. | ........ 348/231.1 |
| 5,633,976 | A | * | 5/1997 | Ogino | ........................ 386/120 |
| 5,852,467 | A | * | 12/1998 | Ogino | ..................... 348/231.1 |
| 5,917,542 | A | * | 6/1999 | Moghadam et al. | .... 348/231.99 |
| 6,108,728 | A | * | 8/2000 | Kobayashi | ................... 710/74 |
| 6,407,772 | B2 | * | 6/2002 | Mizoguchi | ............... 348/220.1 |
| 6,833,860 | B1 | * | 12/2004 | Date | ....................... 348/207.1 |
| 2002/0057350 | A1 | * | 5/2002 | Takei et al. | .................. 348/231 |
| 2003/0184662 | A1 | * | 10/2003 | Porter et al. | ............. 348/231.1 |

FOREIGN PATENT DOCUMENTS

| JP | 10-145717 | | 5/1998 |
| JP | 10145717 | A * | 5/1998 |
| JP | 11069305 | A * | 3/1999 |
| JP | 2000-138630 | | 5/2000 |
| JP | 2002-057936 | | 2/2002 |
| JP | 2002-199322 | | 7/2002 |

* cited by examiner

*Primary Examiner*—David Ometz
*Assistant Examiner*—Wanda M Negron
(74) *Attorney, Agent, or Firm*—Cowan, Liebowitz & Latman, P.C.

(57) ABSTRACT

An imaging apparatus including an image pickup unit, a memory which stores moving image data output from the image pickup unit, a detection circuit which detects that free space of a storage capacity of the memory becomes not more than a predetermined amount, a communicating unit which transmits the moving image data to an external device, and a controller which according to output of the detection circuit provided during photographing the series of moving image data, starts to transmit the moving image data stored in the memory to the external device while photographing the moving image data.

22 Claims, 17 Drawing Sheets

| FIG. 2A |
|---------|
| FIG. 2B |

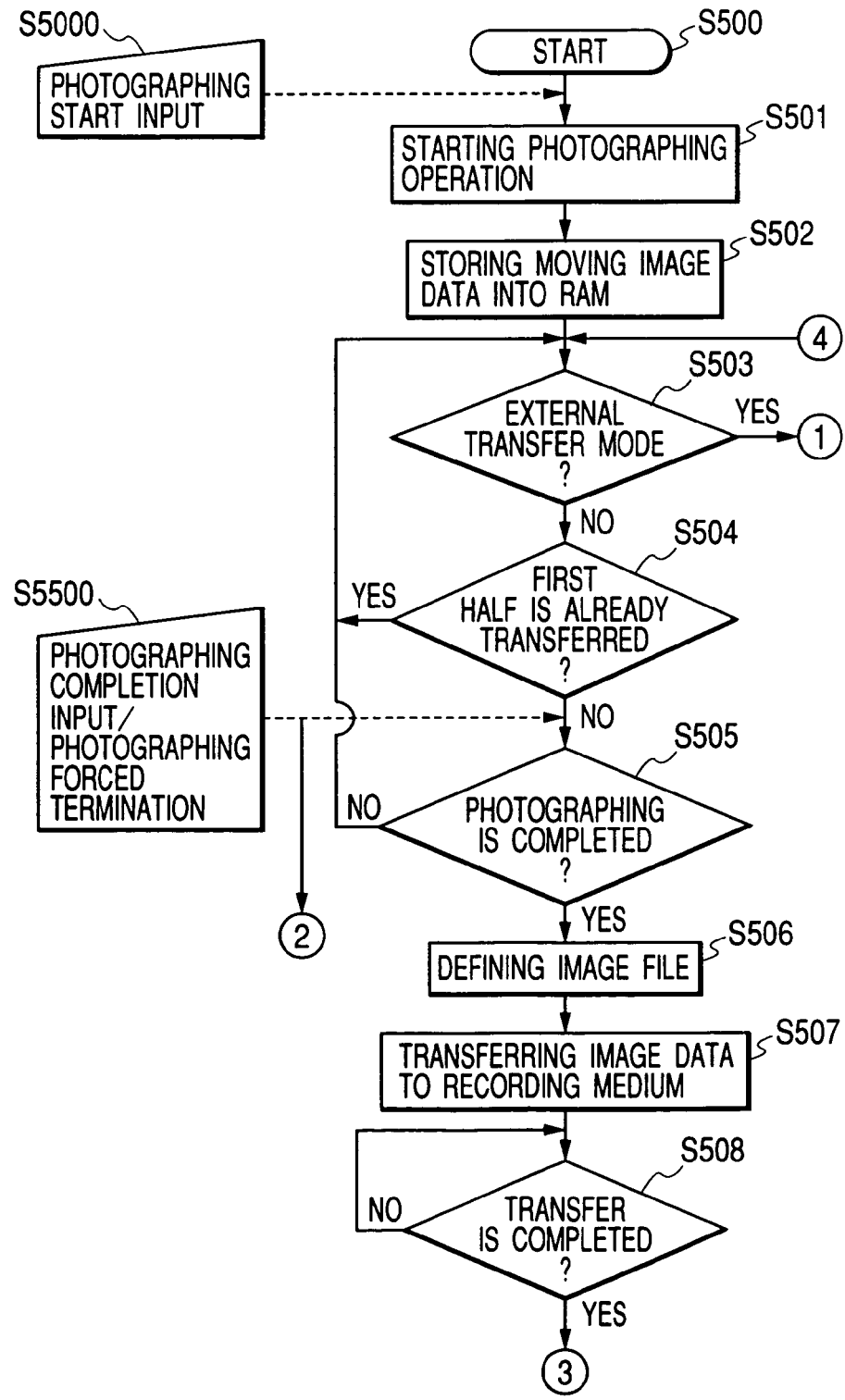

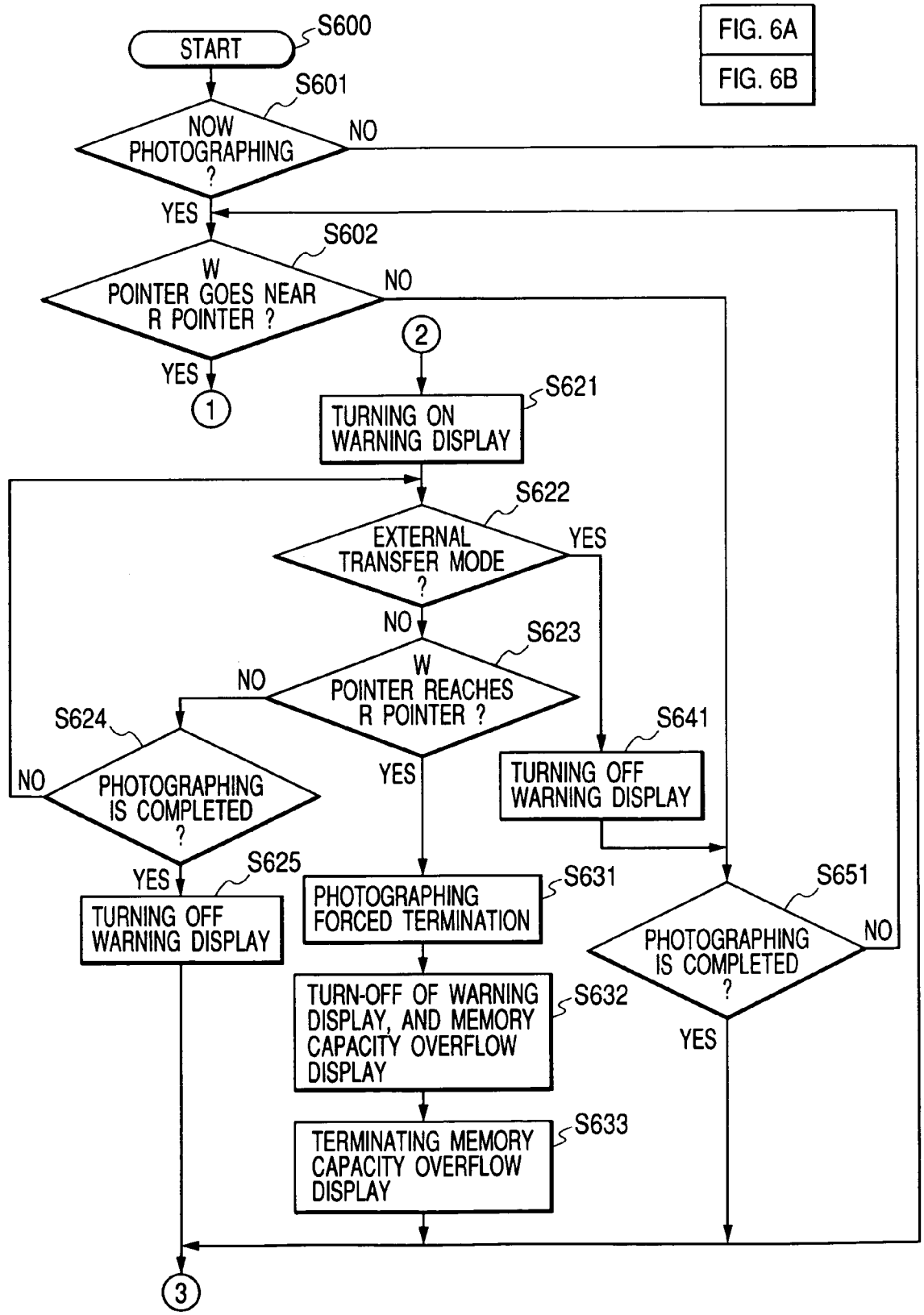

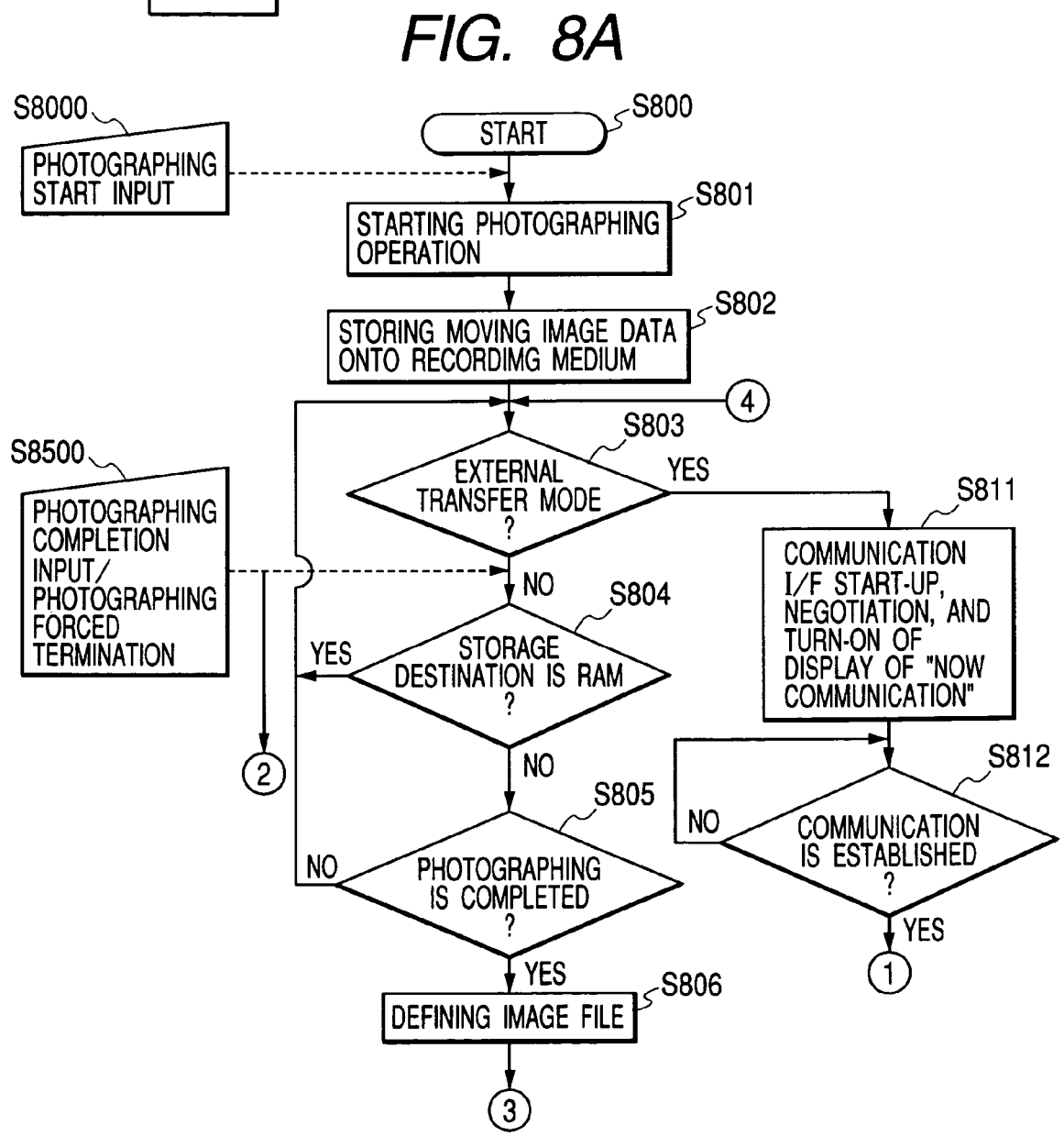

FIG. 9
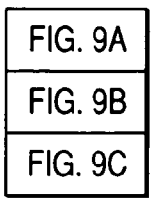
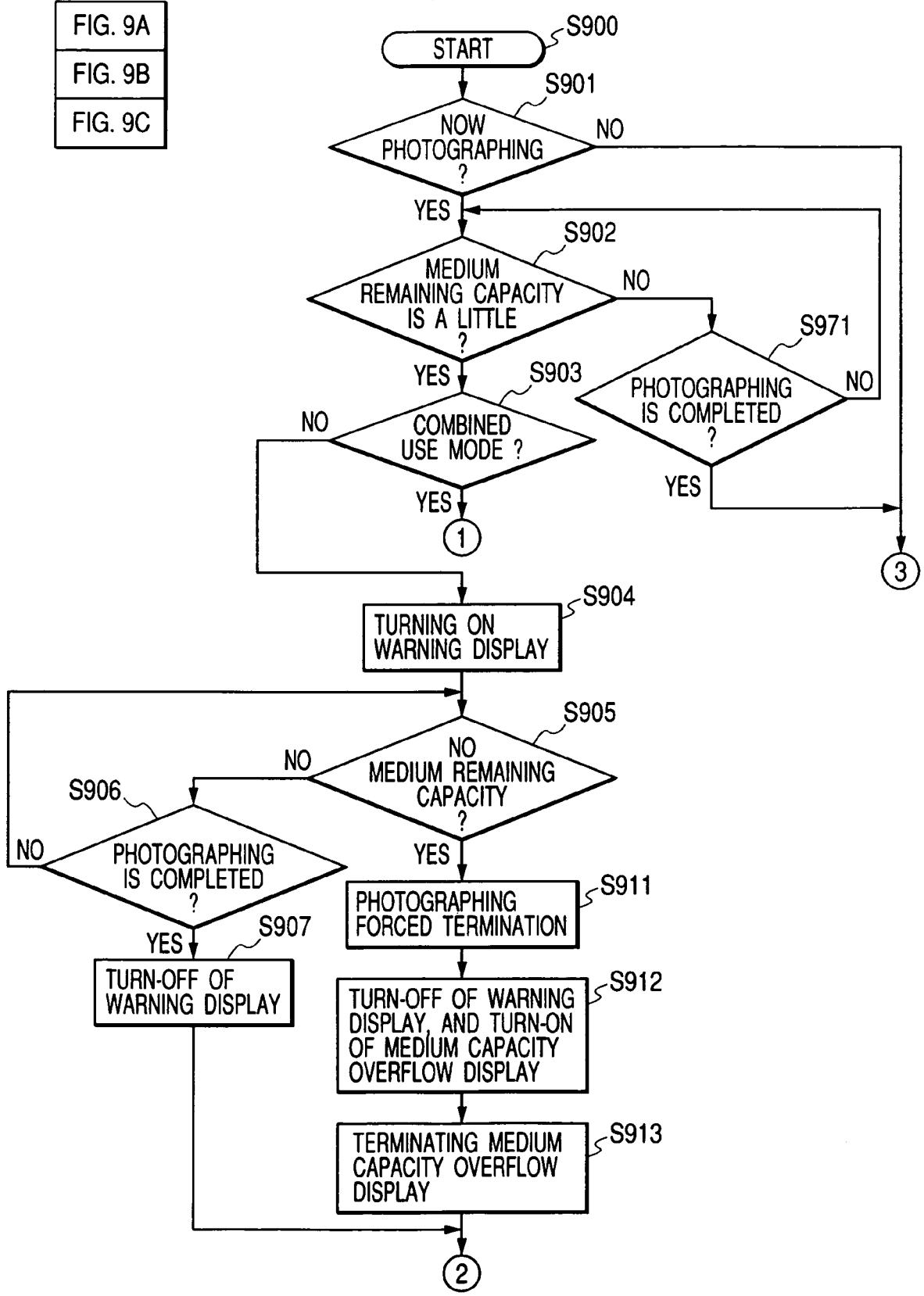
FIG. 9A

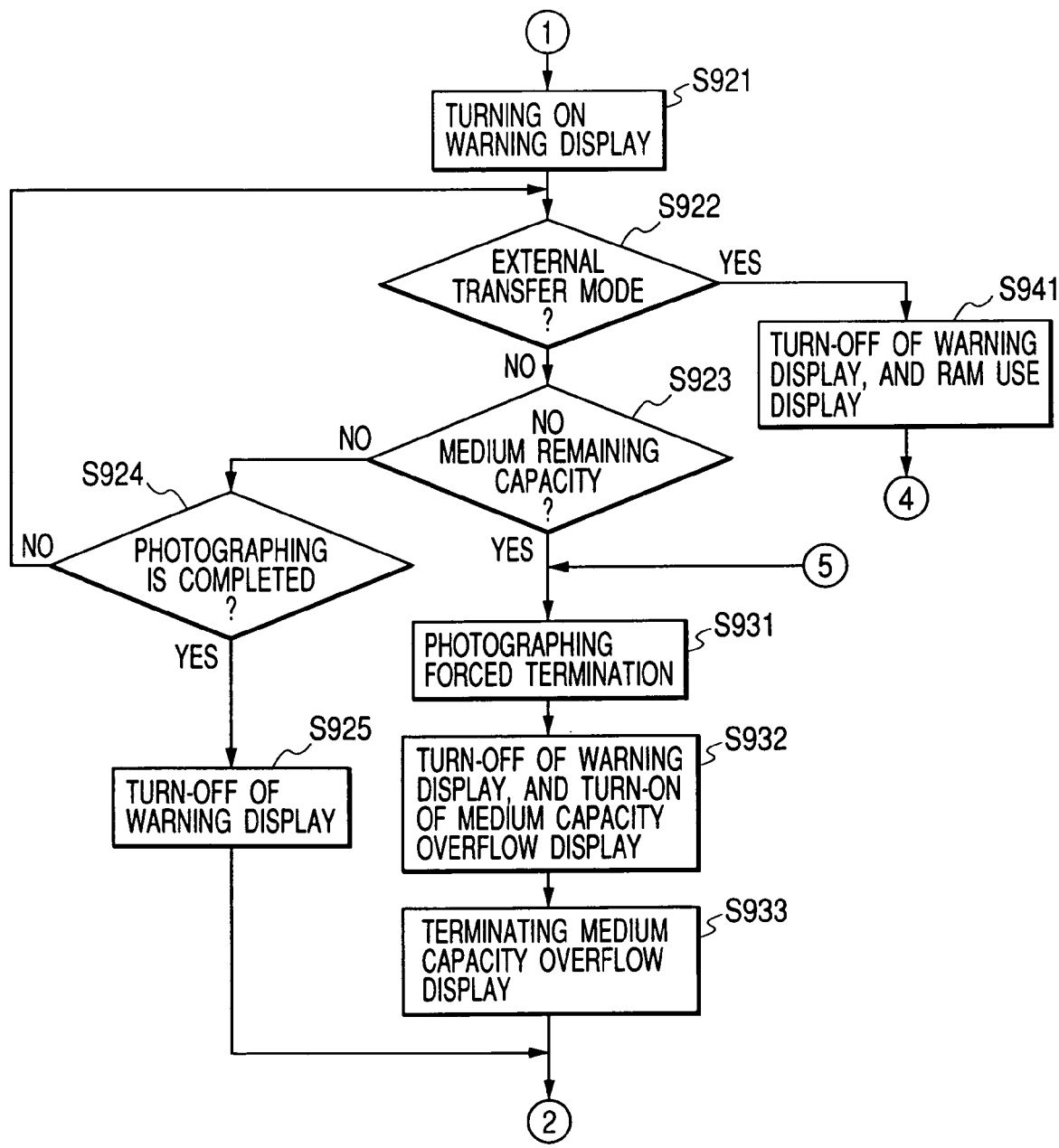

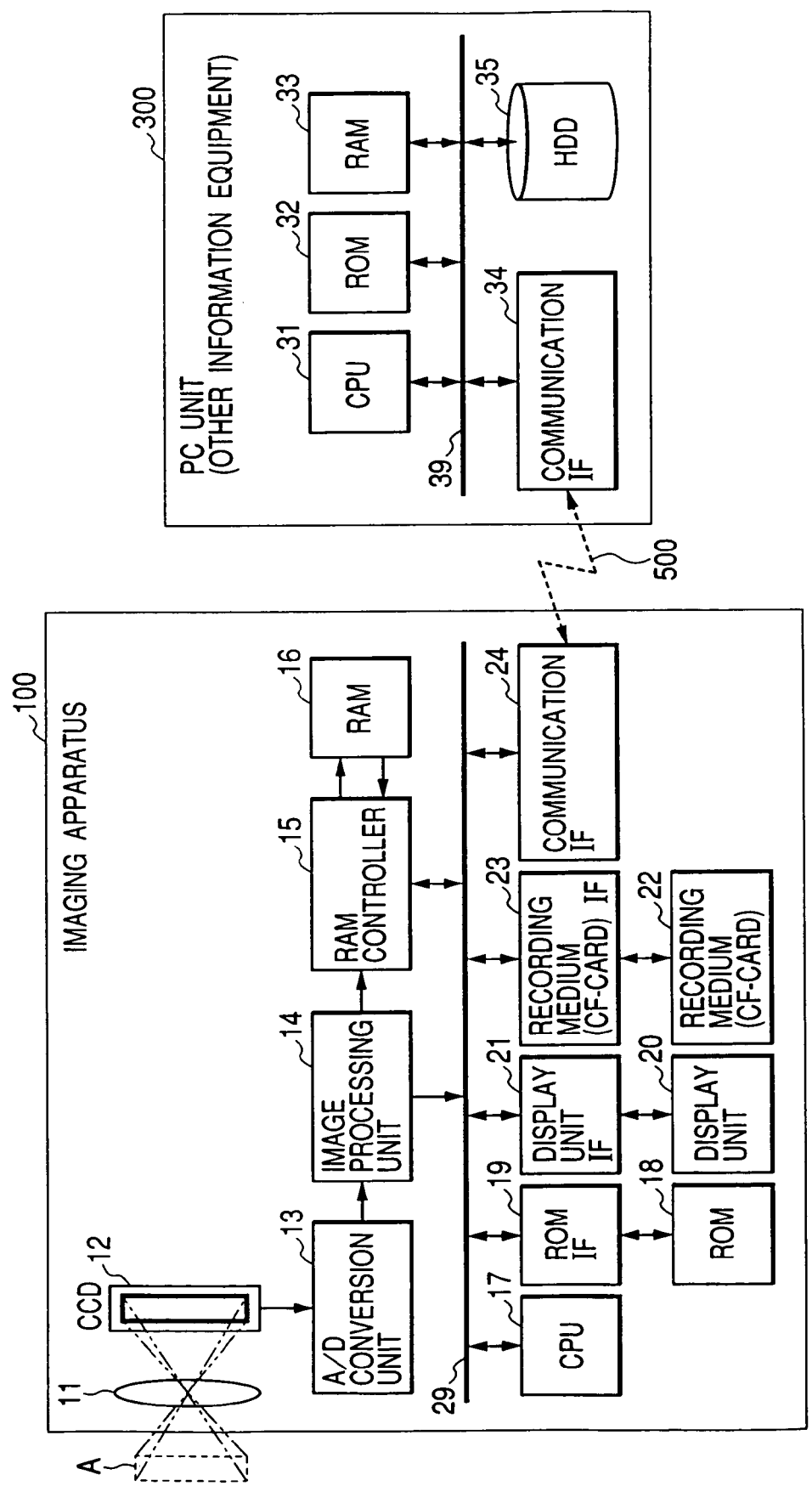

IMAGING APPARATUS

BACKGROUND OF THE INVENTION

1. Field of the Invention

The present invention relates to an imaging apparatus, particularly to the imaging apparatus which can transfer photographed image data to an external device.

2. Related Background Art

Various imaging apparatuses having a moving image photographing function have been proposed and already become commercially practical. For example, in Japanese Patent Application Laid-Open No. 2001-352510, one of those imaging apparatuses is disclosed.

Devices, which store moving image data in a memory such as RAM and ROM or a memory card such as a compact flash (CF) card to which the memory is applied, are also known.

The photographed digital moving image data can be simply captured in a personal computer (PC) by inserting the memory cars into other information equipment such as PC or by wire or wireless communicating means.

Since the moving image can be saved as the digital data by using the imaging apparatus having the moving image photographing function, in order to record various events or to make a moving image document, the imaging apparatus having the moving image photographing function is widely utilized for home and business.

However, in the imaging apparatus having the moving image photographing function, there is the following problem.

Since the memory for storing the moving image data has a finite storage capacity, when free space of the memory has run out during photographing the moving image, there happens a situation in which the photographing moving image is interrupted halfway through a task.

Particularly, in the imaging apparatus in which a still image photographing function is mainly designed, the capacity of the mounted storing means tends to be decreased, so that this problem is significant.

For example, in order to solve the above-described problem, when the plurality of memory cards are used one after another, there appears a part where the continuous moving image is interrupted. Further, the plurality of memory cards store separately the moving image files, and the moving image data can not be saved in the form of one image file, so that there is the problem that this method lacks user-friendliness.

With respect to a still image, as disclosed in Japanese Patent Application Laid-Open No. 2001-128113, when the free space of the memory is lessened, image information is transferred to another storage device. However, in Japanese Patent Application Laid-Open No. 2001-128113, it is not assumed that the photographing is performed during transferring the image data. Since the photographing can not be performed during transferring the image data, this method can not deal with the above-described problem.

SUMMARY OF THE INVENTION

It is an object of the invention to solve the above-described problem.

It is another object of the invention to be able to save the continuous image data without interruption even if the free space of the memory has run out during the photographing.

It is still another object of the invention to be able to save a series of image data as one image file.

In order to solve the problem and to achieve the objects, according to an aspect of the present invention, an imaging apparatus of the present invention comprises image pickup means, storing means for storing moving image data output from the image pickup means, detecting means for detecting that free space of storage capacity of the storing means becomes not more than a predetermined amount, communicating means for transmitting the moving image data to an external device, and controlling means for controlling the image pickup means and the communicating means according to output of the detecting means provided during photographing a series of the moving image data so as to start to transmit the moving image data stored in the storing means to the external device, while photographing the moving image data.

These and other objects and advantages of the invention may be readily ascertained by referring to the following detailed description and appended drawings.

BRIEF DESCRIPTION OF THE DRAWINGS

FIG. 10 shows the configuration of the imaging apparatus according to a fifth embodiment.

DETAILED DESCRIPTION OF THE PREFERRED EMBODIMENTS

Figure 1:
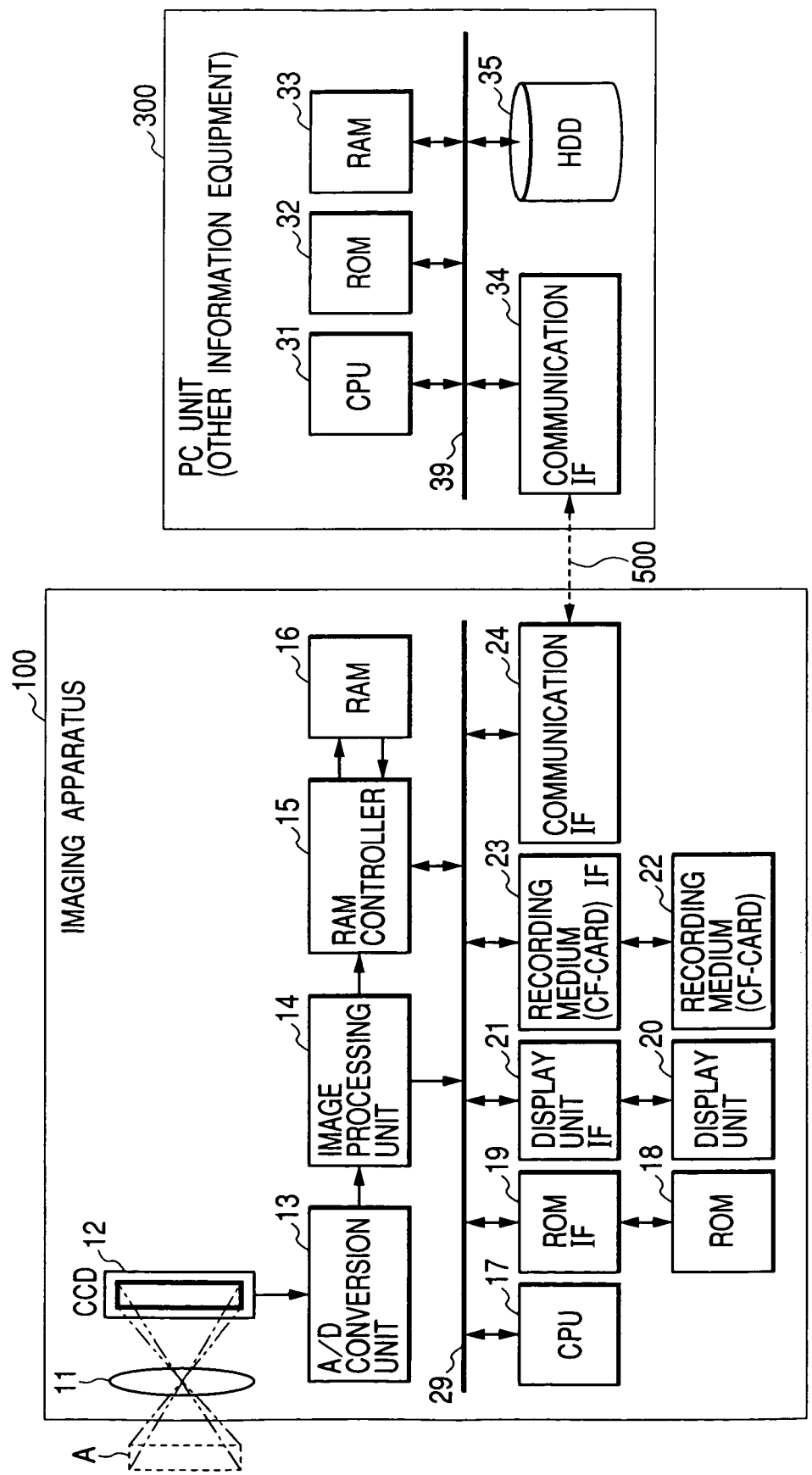
FIG. 1 shows a configuration of an imaging apparatus according to a-first embodiment of the invention.

Preferred embodiments to which the invention applied will be described in detail referring to the accompanying drawings. The same reference numeral and sign indicate the same component or the corresponding component throughout the accompanying drawings.

First Embodiment

FIG. 1 shows a configuration of the imaging apparatus according to a first embodiment of the invention and the configuration of a PC unit which is of other information equipment connected to the imaging apparatus as required.

In FIG. 1, a reference sign of A denotes an object image. An imaging apparatus 100 includes an optical system 11 such as a lens, a CCD 12 which is of an image pickup device, an AD conversion unit 13, an image processing unit 14, a RAM controller 15, and RAM 16. The image processing unit 14 performs signal processing such as shading correction, gamma correction, and the like, by which a digital image input signal input through the AD conversion unit 13 is converted into an RGB signal adaptable to a human visual sense. The RAM controller 15 is connected to a main CPU bass 29 and RAM 16.

The imaging apparatus 100 also includes CPU 17 which controls the overall imaging apparatus 100, ROM 18 in which a method of controlling the overall imaging apparatus 100 and the like are described, ROM I/F 19 which fulfills an interface between ROM 18 and the main CPU bass 29, a display unit 20 which gives a direction concerning operation to the image and a user during image pickup, and a display unit I/F 21 which fulfills the interface between the display unit 20 and the main CPU bass 29. It is desirable that the display unit 20 is configured so that the display unit 20 and a screen in which the user confirms the picked-up image are simultaneously viewed during image pickup.

Further, the imaging apparatus 100 includes a recording medium 22 which is of memorizing means for storing the image which has been picked up, a recording medium I/F 23 which fulfills the interface between the recording medium 22 and the main CPU bass 29, and a communication I/F 24 which is of communicating means for fulfilling a function of communication with other information equipment or the like.

It can be mainly assumed that the recording medium 22 is a card type recording medium. Although a CF card can be cited as an example of the card type recording medium, various kinds of the recording mediums can be used as the recording medium 22. Circuits of wire communication standard such as USB standard and IEEE1394 standard, wireless LAN, BLUETOOTH, and infrared communication such as IrDA are applicable to the communication I/F 24. The imaging apparatus 100 can communicate with other information equipment through the communication I/F 24. Any circuit described above can be used as the communication I/F 24. However, the case in which USB is used is mainly described in the embodiment.

A PC unit 300 is of other information equipment. CPU 31, ROM 32, and RAM 33 are incorporated in the PC unit 300 and connected to a main CPU bass 39. Similarly to the imaging apparatus 100, the PC unit 300 also includes a communication I/F 34, and the communication I/F 34 is connected to the main CPU bass 39. The PC unit 300 has the configuration which can communicate with various kinds of equipment including the imaging apparatus 100.

Further, the PC unit 300 includes a hard disk drive (HDD) 35 which is of a large-capacity storage device, and the hard disk drive 35 is also connected to the main CPU bass 39. The PC unit 300 can store a large amount of data including the image data such as the still image and the moving image.

Figures 2, 2A:
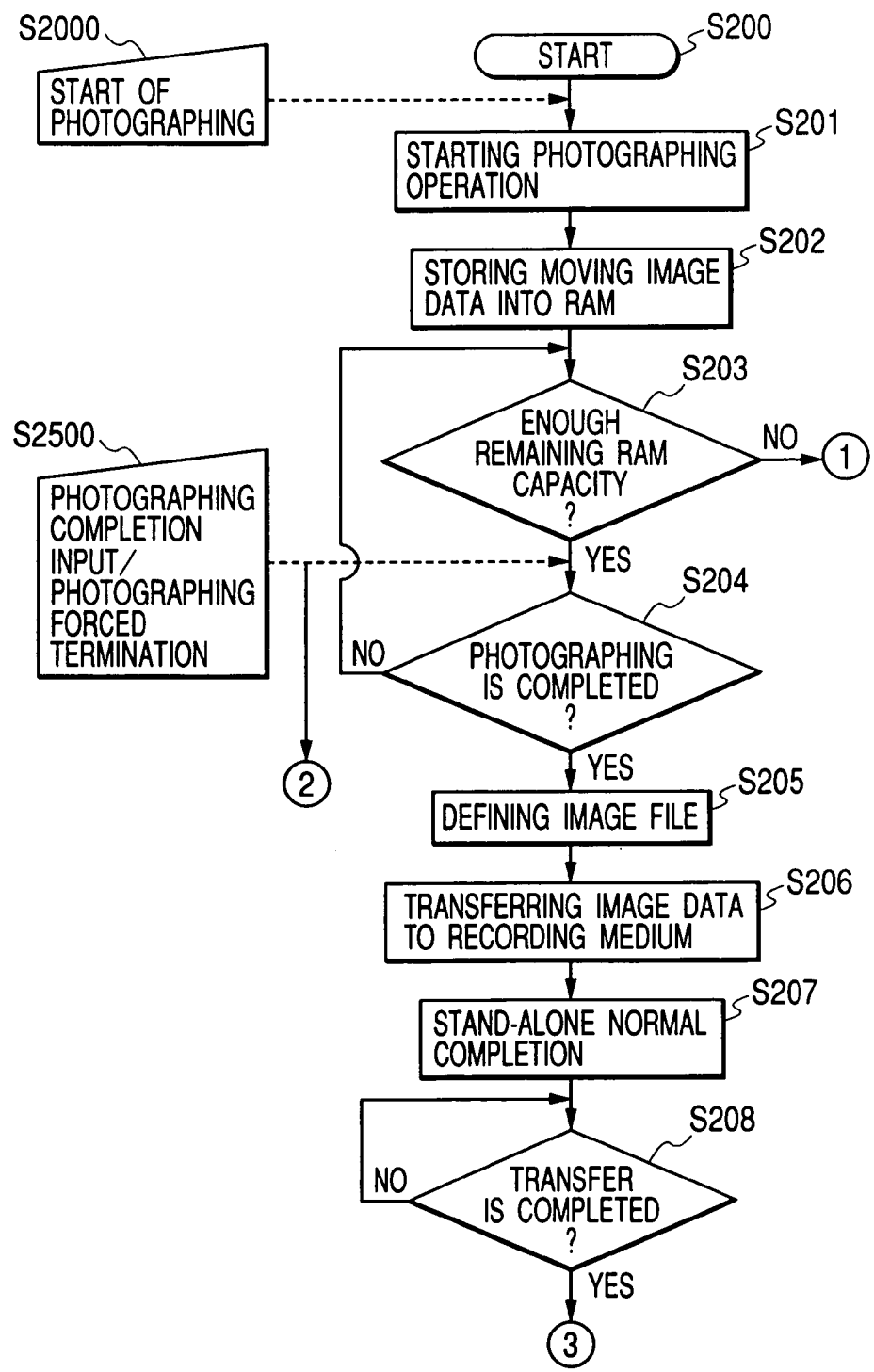
FIG. 2 is comprised of FIGS. 2A and 2B are flow charts showing operation of the imaging apparatus according to the first embodiment.
Figure 2B:
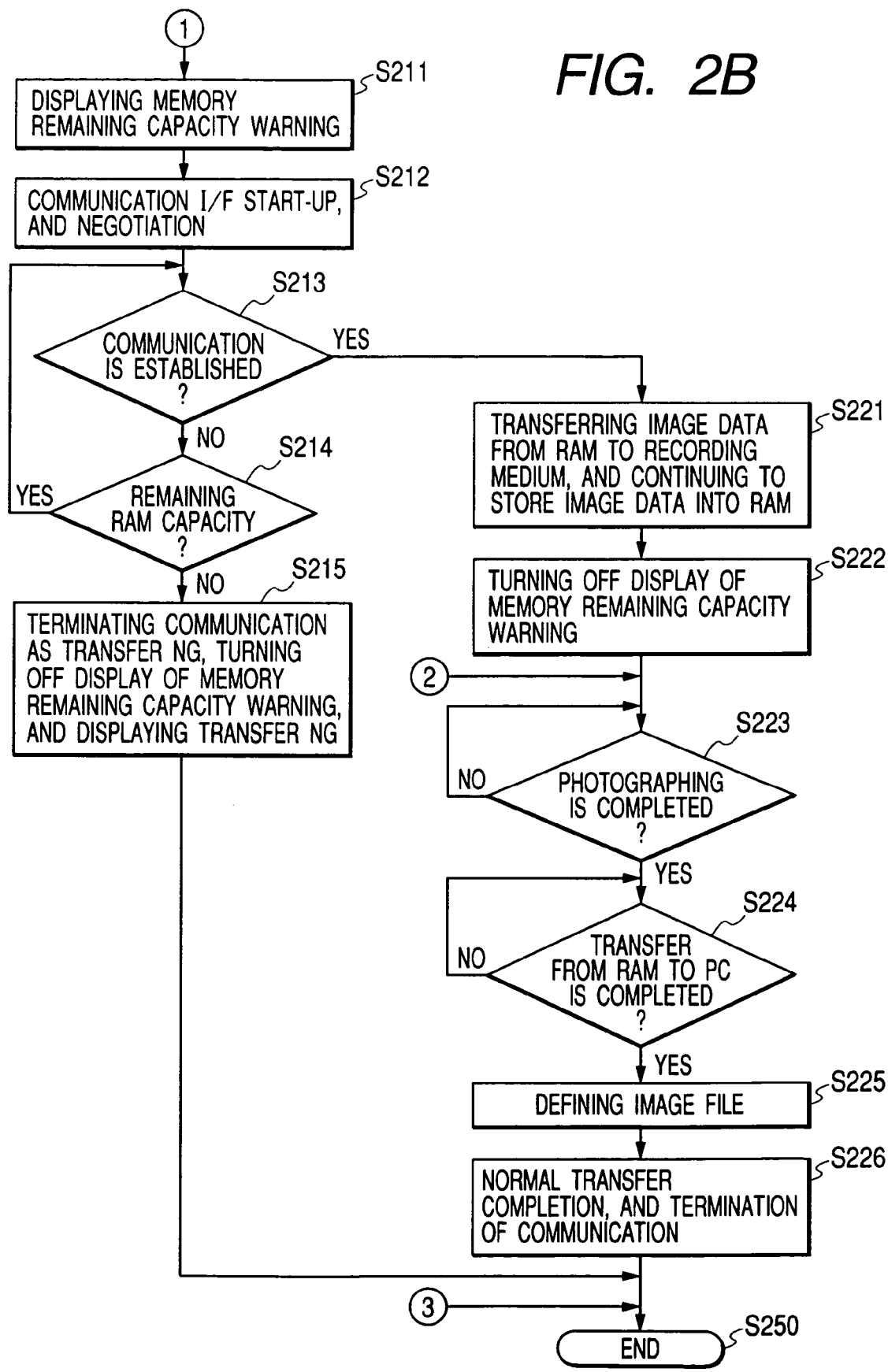

FIGS. 2A and 2B are flow charts showing operation of the imaging apparatus 100 of the first embodiment. The operation of the imaging apparatus 100 shown in FIG. 1 will be described by the use of the flow chart shown in FIGS. 2A and 2B.

When the user depresses a photographing button (not shown), a photographing start signal is input (S2000) to start moving image photographing operation (S200 and S201). When the moving image photographing operation is started, photoelectric conversion of the image of the object image incident to CCD 12 through the optical system 11 is performed on each pixel basis by CCD 12, and the converted image is transmitted to the AD conversion unit 13. The AD conversion unit 13 converts an analog value concerning a shade of each color in each pixel into digital data and transmits the converted data to the image processing unit 14.

The image processing unit 14 performs the image processing adaptable to the human visual sense, such as the shading correction and the gamma correction, on the digital image input signal input from the AD conversion unit 13, and the image processing unit 14 converts the digital image input signal into the RGB signal to output. The moving image data output from the image processing unit 14 is sequentially written in RAM 16 through the RAM controller 15 (S202).

For example, the imaging apparatus 100 sequentially processes the image at a rate of 30 frames per minute to record the moving image data. The moving image data is continuously generated from the image processing unit 14 and written in RAM 16, as long as the image pickup is continued.

In FIG. 1, the image processing unit 14 is also connected to the main CPU bass 29. However, in the embodiment, the moving image data to which the image processing is performed by the image processing unit 14 is not transmitted through the main CPU bass 29.

The embodiment has the configuration in which a series of moving image data stored in RAM 16 which is of the memorizing means (buffer memory) is usually defined as one moving image file upon completion of the photographing and the image file is collectively transmitted to recording medium 22 to save.

CPU 17 continues to monitor free space in RAM 16 while sequentially writing and storing the moving image data in RAM 16 in the above-described way (S202). CPU 17 continues to decide whether there is enough free space in RAM 16 or not (S203).

When CPU 17 decides that there is enough free space in RAM 16, CPU 17 decides whether the photographing is completed or not (S204).

The decision of the completion of the photographing is performed as follows:

When the user depresses the photographing button (not shown) again under the condition of photographing the moving image, a photographing completion signal is input (S2500). When the storage of the moving image data in RAM 16 is completed after the photographing completion signal is input, a photographing completion flag on a hardware circuit. (not shown, and initial state is logic L) is set to logic H. CPU 17 can recognize the completion of the photographing by reading the logic H of the photographing completion flag. When CPU 17 recognizes that the photographing is completed, CPU 17 returns the photographing completion flag to the initial state by setting the photographing completion flag to the logic L.

When CPU 17 decides that the photographing of the moving image is not completed, CPU 17 returns the operation to S203. In the case where there is enough free space in RAM 16 and the photographing is not completed, the steps of S203 and S204 are repeated.

On the other hand, when CPU 17 decides that the photographing is completed, the series of moving image data stored in RAM 16 is fixed as one moving image file (S205). CPU 17 reads out the moving image data from RAM 16 and transfers the moving image data to the recording medium 22 through the recording medium I/F 23 to write the whole moving image data of the moving image file in the recording medium 22 (S206). When the operation of writing the moving image data in the recording medium 22 is completed, the moving image photographing operation is normally completed in the imaging apparatus 100 by itself (S207) and the moving image imaging operation is ended (S250).

In the case where there is not enough free space in RAM 16 before giving a direction to stop the photographing, CPU 17 issues a warning display indicating that there is not enough free space to the display unit 20 through the display unit I/F 21 (S211).

Since the communication means is the USB cable in the embodiment, in order to turn on the communication I/F 24, CPU 17 also displays a message that requires the user to connect the USB cable which is of the communication cable.

Then, CPU 17 starts up the communication I/F 24 through the main CPU bass 29 to start negotiation with PC 300 which is of the connected party (S212). CPU 17 monitors whether the communication is established or not (S213).

In the case where the communication is not established, CPU 17 continues to monitor whether the communication is established or not, while CPU 17 decides whether there is still enough free space in RAM 16 or not (S214). In the case where the communication is not established due to disconnection of the USB cable, incompletion of negotiation, or the like when the free space in RAM 16 is not enough, the transfer becomes NG. CPU 17 performs the display indicating that the transfer can not be performed (S215) while CPU 17 terminates the communication to stop the warning display, and the moving image photographing operation is ended (S250). At this point, it is possible to transfer the moving image data remaining in RAM 16 to the recording medium 22 or other information equipment.

When the USB cable is connected and the negotiation with PC 300 is completed, while the imaging operation is continued, CPU 17 reads out the moving image data stored in RAM 16 in order from a front end, transfers the moving image data to the communication I/F 24, and transfers the moving image data to the communication I/F 34 in PC 300 (S221). When the transfer of the moving image data is started, since the imaging operation is continued, there is the time when the moving image data is sequentially written and stored in RAM 16 through the RAM controller 15 during the transfer. Therefore, there is the time when the write and the readout are simultaneously performed in RAM 16. For access to RAM 16, the write and the readout are time-shared, or RAM 16 is formed to have a dual port to perform the write and the readout at the same time.

In PC 300, after the communication I/F 34 receives the moving image data, the moving image data is sequentially stored in HDD 35 through the main CPU bass 39.

When the transfer of the moving image data to PC 300 is started, CPU 17 turns off the warning display indicating that the free space in RAM 16 is not enough (S222). Then, similarly to S204, CPU 17 decides whether the photographing is completed or not (S223). When the photographing is completed, CPU 17 polls whether the transfer of the moving image data from RAM 16 to PC 300 is perfectly completed or not (S224). When the transfer of the moving image data is completed, the imaging apparatus 100 gives a command for fixing the transferred series of moving image data as one image file through the communication I/F 24.

When PC 300 receives the command, the received moving image data is fixed as one image file in such a manner that CPU 31 analyzes the command and gives the direction to HDD 35 (S225). Then, the completion of this operation is informed back to the imaging apparatus 100. As a result, the transfer of the moving image data to PC 300 is normally completed and the communication is terminated (S226), and the moving image photographing operation is ended (S250).

According to the above-described configuration, in the first embodiment, even if free space in RAM 16 becomes not enough during photographing the moving image, the moving image can be saved as one moving image file without interrupting the continuous moving image, so that it is very useful.

Second Embodiment

Then, a second embodiment of the invention will be described.

Similarly to the first embodiment, FIG. 1 is also used in the second embodiment, so that the second description about FIG. 1 is partly omitted. In FIG. 1, the image processing unit 14 is configured to be also connected to the main CPU bass 29. However, in the second embodiment, the processing of the moving image data is not performed through the main CPU bass 29.

Figure 3:
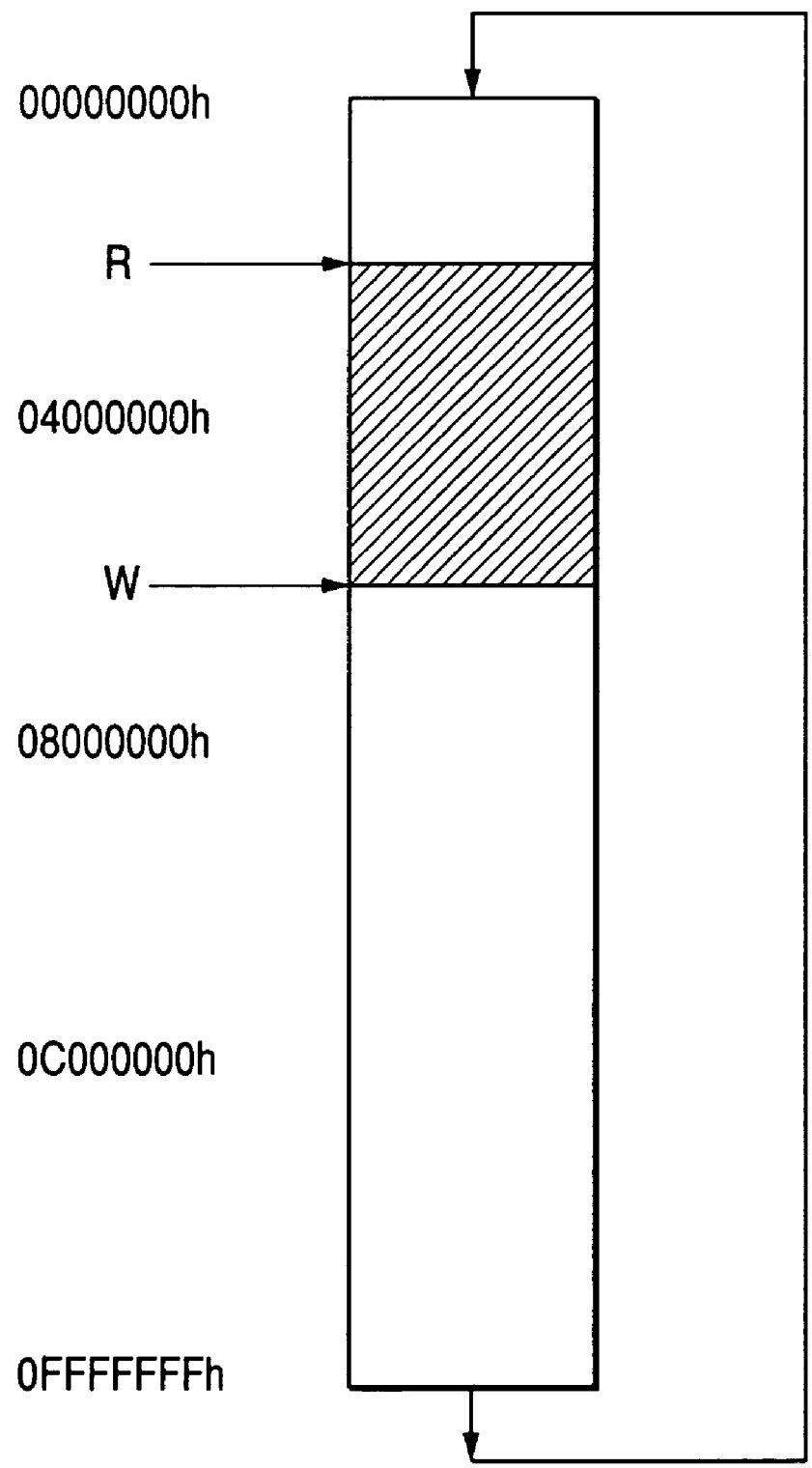
FIG. 3 is a view for explaining a ring buffer configuration.

In memory address management of RAM 16, the present embodiment has a ring buffer configuration shown in FIG. 3.

The ring buffer configuration shown in FIG. 3 will be described below.

In RAM 16, it is assumed that an address area which can store the moving image data ranges from the address of 00000000h to the address of 0FFFFFFFh. A write pointer W and a read pointer R indicate the address in which the data should be written and the address in which the data should be read respectively.

When the data is sequentially written and stored in RAM 16 under the above-described condition, the write pointer W is incremented in order from the address of 00000000h to the address of 0FFFFFFFh in each case. When the write pointer W reaches the address of 0FFFFFFFh, the write pointer W returns to the address of 00000000h and continues the same write operation.

On the other hand, when the data is sequentially read out from RAM 16 to another device, the read pointer R is incremented in order from the address of 00000000h to the address of 0FFFFFFFh in each case. When the read pointer R reaches the address of 0FFFFFFFh, the read pointer R returns to the address of 00000000h and continues the same readout operation.

The case in which the write pointer W proceeds and comes close to the read pointer R means that the free space in RAM 16 is lessened, and the case in which the write pointer W further proceeds and reaches the read pointer R means that the free space in RAM 16 has run out (becomes zero). In the case where the write pointer W proceeds and reaches the read pointer R, CPU 17 controls RAM 16 so that the further writing is prohibited to protect the data.

The case in which the read pointer R proceeds and comes close to the write pointer W means that the data to be read out from RAM 16 is lessened at that time, and the case in which the read pointer R further proceeds and reaches the write pointer W means that the data to be read out from RAM 16 has run out (becomes zero). In the case where the read pointer R proceeds and reaches the write pointer W, CPU 17 controls RAM 16 so that the further readout is prohibited to protect the data.

The ring buffer configuration is used in the present embodiment. However, needless to say, the non-use of the ring buffer configuration is not deviated from the scope of the invention. The ring buffer configuration can be also used in the first embodiment. In this case, the use of the ring buffer configuration is not also deviated from the scope of the invention.

FIGS. 4, 5A, 5B, 6A and 6B are the flow chart showing the operation of the imaging apparatus of the embodiment. One operation of the imaging apparatus is held by the use of all the cases shown in FIGS. 4, 5, and 6, so that all the cases are described, and the flow charts shown in FIGS. 5A, 5B, 6A and 6B are described in parallel.

In the configuration shown in FIG. 1, the operation of the present embodiment will be described below by the use of the flow charts shown in FIGS. 4, 5, and 6.

Figure 4:
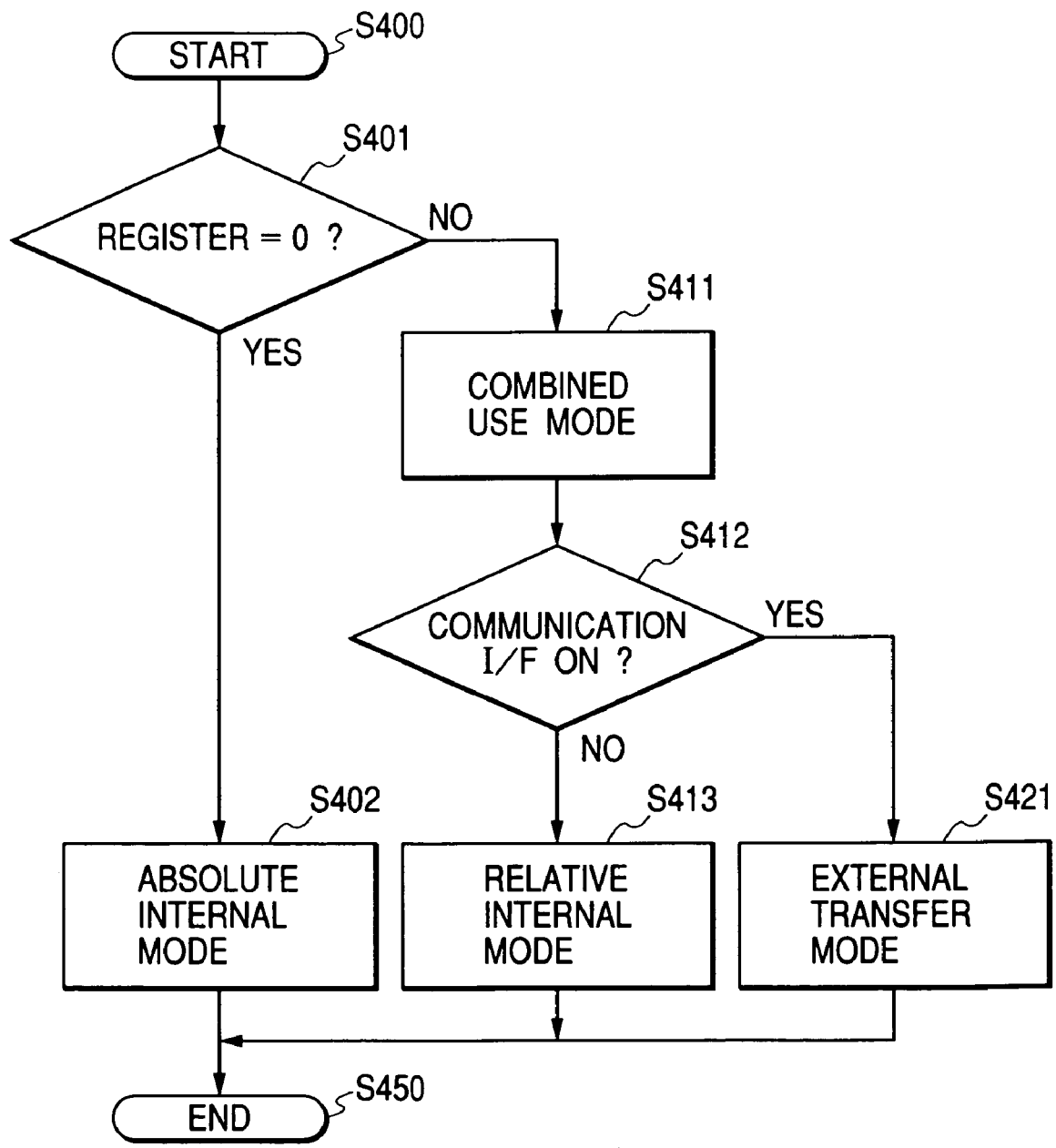
FIG. 4 is a flow chart showing the operation of the imaging apparatus according to a second embodiment.

FIG. 4 is the flow chart concerning mode setting in the second embodiment.

In the mode setting, the user performs selection of mode as to whether the photographing data of the moving image is transferred to the outside during the photographing or not, by button operation of an operation unit (not shown). In the embodiment, when the user sets the transfer of the moving image data to the outside during the photographing to disable, a register (not shown) is set to 0. When the user sets the transfer of the moving image data to the outside during the photographing to enable, the register (not shown) is set to 1.

In the flow chart after the steps from S400 concerning the mode setting, CPU 17 confirms the register to decides whether the register 0 or 1 (S401). When the value of the register is 0, the mode setting becomes an absolute internal mode (S402) and the moving image data is never transferred to the outside during the photographing.

On the other hand, when the value of the register is 1, the mode setting becomes a combined use mode (S411). In the combined use mode, CPU 17 decides whether the communication I/F 24 is turned off or on (S412). When the communication I/F 24 is turned off, the combined use mode shifts to a relative internal mode (S413). When the communication I/F 24 is turned on, the combined use mode shifts to an external transfer mode (S421).

IN the relative internal mode, the moving image data is not transferred to the outside during the photographing. However, depending on the start up of the communication I/F 24, the relative internal mode can be changed to the external transfer mode even in photographing the image. In the external transfer mode, the moving image data is transferred to the outside during the photographing. However, when the communication I/F 24 is terminated, the external transfer mode can be changed to the relative internal mode even in photographing the same image.

Therefore, it is assumed that the decision and the change of the relative internal mode and the external transfer mode caused by on and off states of the communication I/F 24 can be always updated by interrupting means or the like.

The on-state of the communication I/F 24 means the communicable state in which the communication I/F 24 is connected to other information equipment with wire or wireless means. For example, in the case where the communication I/F 24 is USB, the communication I/F 24 is connected to the specific information equipment with the communication cable and the communication I/F 24 is in the communicable state. In the case where the communication I/F 24 is another means, the communication I/F 24 also is in the communicable state.

In the present embodiment, since it can be also assumed that the image data of the moving image is never transferred to the external device, the absolute internal mode is included in the mode. However, the absolute internal mode is not always required, and the case in which the absolute internal mode is absent can be also included within the range of the technical ideas of the invention.

Figure 5B:
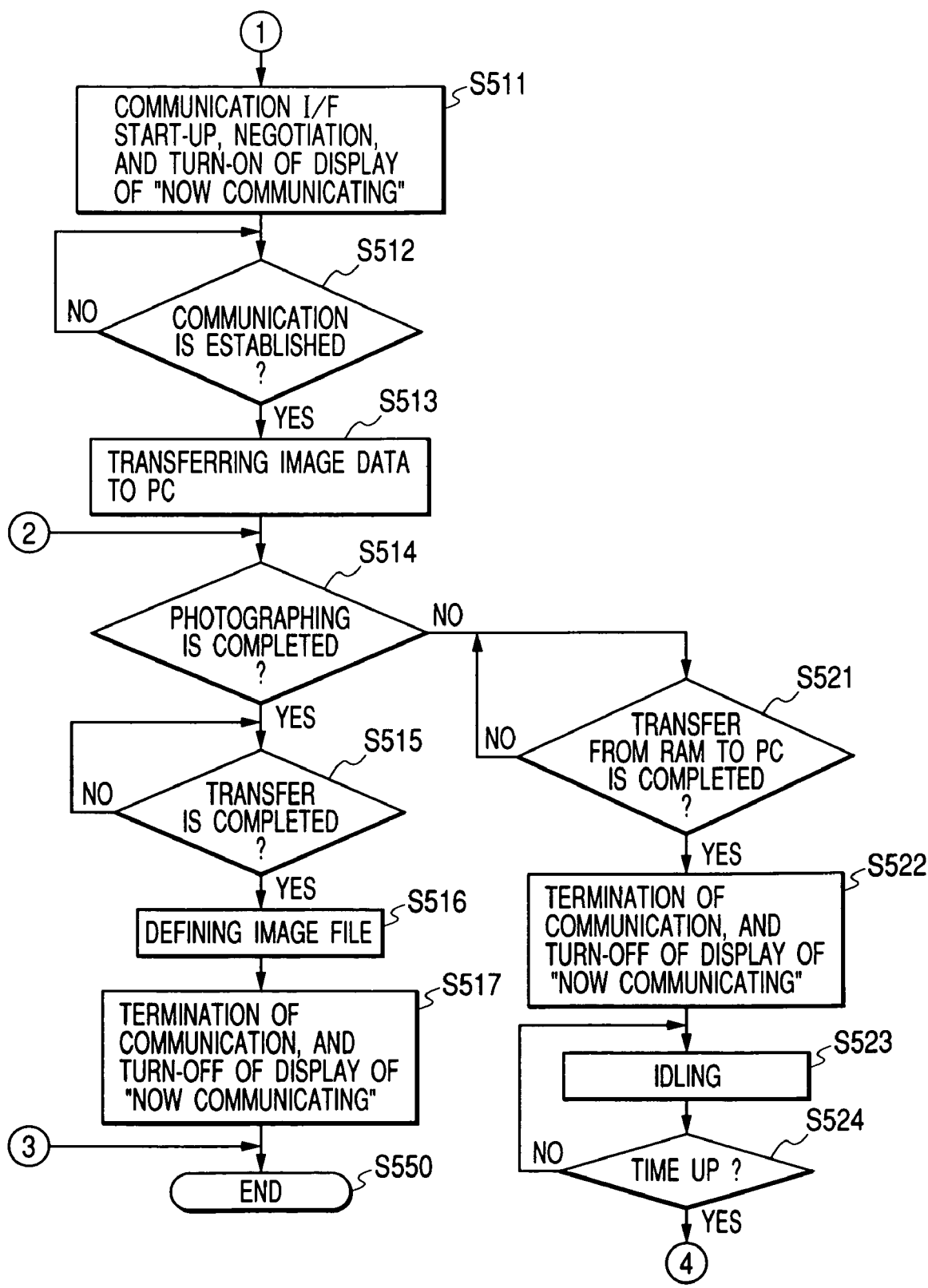
FIG. 5 is comprised of FIGS. 5A and 5B are flow charts showing the operation of the imaging apparatus according to the second embodiment.
Figure 6B:
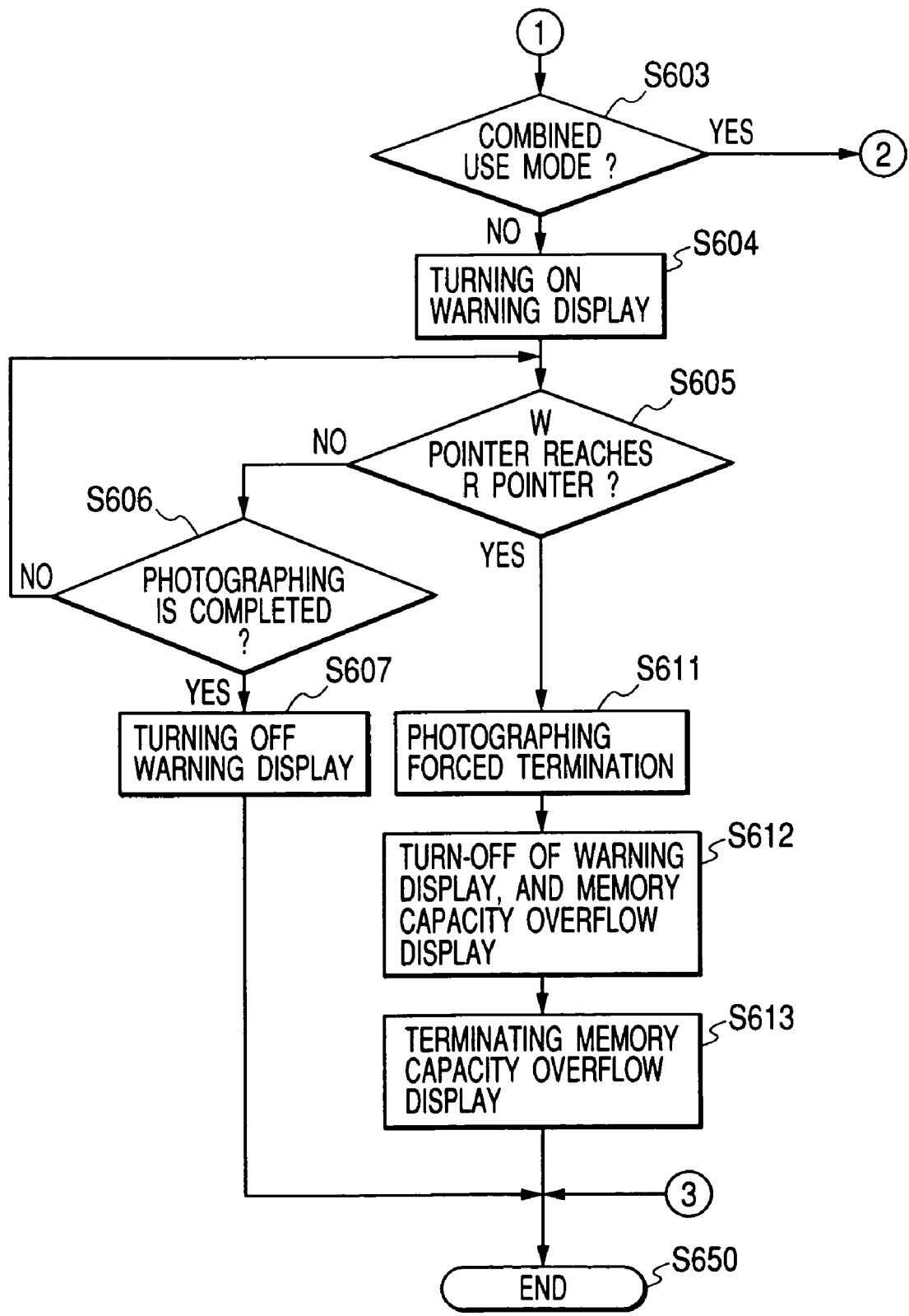
FIG. 6 is comprised of FIGS. 6A and 6B are flow charts showing the operation of the imaging apparatus according to the second embodiment.

FIGS. 5A and 5B are flow charts concerning the data transfer in the embodiment, and FIGS. 6A and 6B are flow charts concerning the warning display in the embodiment.

In the embodiment, these flow charts are operated in parallel. The following description will be performed by the use of the flow charts shown in FIGS. 5A, 5B, 6A and 6B.

When the user depresses a photographing button (not shown), a photographing start signal is input (S5000) to start moving image photographing operation (S500 and S501). The embodiment also has the configuration in which the series of moving image data stored in RAM 16 is usually fixed as one moving image file upon completion of the photographing and the image file is collectively transmitted to recording medium 22 to save. Therefore, similarly to the first embodiment, the generated moving image data is sequentially stored in RAM 16 (S502).

The flow chart concerning the warning display in FIGS. 6A and 6B can be executed only during the photographing.

When the imaging operation is started, CPU 17 monitors whether the write pointer W shown in FIG. 3 comes close to the read pointer R shown in FIG. 3 or not (S602). That is to say, CPU 17 monitors the free space of RAM 16 by monitoring the ring buffer shown in FIG. 3. When the write pointer W does not come close to the read pointer R, CPU 17 confirms whether the photographing is completed or not (S651). When the photographing is not completed, CPU 17 performs the processings of S602 and S651. When the write pointer W does not come close to the read pointer R and the photographing is not completed, the processings of S602 and S651 is repeated.

Since the following operation depends on the mode setting described in FIG. 4, the description will be done in each mode.

At first, the case in which the mode is set to the absolute internal mode will be described. In FIGS. 6A and 6B, when the write pointer W comes close to the read pointer R and the free space of RAM 16 is lessened, CPU 17 confirms whether the mode is the combined use mode or not (S603).

In the case of the absolute internal mode, the operation proceeds to S604, and CPU 17 performs the warning display indicating that the free space in RAM 16 is lessened. Then, CPU 17 monitors whether the write pointer W reaches the read pointer R and the free space in RAM 16 has perfectly run out or not (S605).

When the write pointer W has reached the read, pointer R, CPU 17 forces the photographing to terminate (S611), and CPU 17 stops the warning display indicating that the free space in RAM 16 is lessened and performs the display indicating that the free space in RAM 16 has run out (S612). Then, CPU 17 stops the display indicating that the free space in RAM 16 has run out (S613) and ends the series of warning displays (S650).

In the case where the free space of RAM 16 is still remains in S605, CPU 17 monitors whether the photographing is completed or not (S606), and CPU 17 repeatedly monitors whether the write pointer W reaches the read pointer R or not and whether the photographing is completed or not until the photographing is completed. When the photographing is completed while the free space of RAM 16 is still remains, CPU 17 stops the warning display indicating that the free space in RAM 16 is lessened (S607) and ends the series of warning displays (S650).

In this case, the following operation is performed in the flow chart concerning the data transfer in FIGS. 5A and 5B.

While the operation of storing the moving image data in RAM 16 is continued during the photographing (S502), CPU 17 decides whether the mode is external transfer mode or not (S503). At this point, the absolute internal mode is currently described, so that the operation proceeds to S504.

In S504, CPU 17 decides whether a first half of the series of photographed moving image data is transferred to PC 300 or not. In this case, since the first half of the series of photographed moving image data is not transferred to PC 300, the operation proceeds to S505. In S505, CPU 17 monitors whether the photographing is completed or not. The steps from S503 to S505 are repeatedly performed until the photographing is completed. Regardless of whether the photographing is completed forcedly or normally, when the photographing is completed, the operation proceeds to S506 and the series of the moving image data from the start of the photographing to the completion is fixed as one moving image file.

Even if the photographing is forcedly terminated, the series of the moving image data from the start of the photographing to the forced termination is fixed as one moving image file. After the moving image file is fixed, CPU 17 reads out the moving image data from RAM 16 and transfers the moving image data to the recording medium 22 through the recording medium I/F 23 to write the whole moving image data of the moving image file in the recording medium 22 (S507). When the operation of writing the moving image data in the recording medium is completed (S508), the stand-alone normal completion is performed in the imaging apparatus 100, and the moving image photographing operation is ended (S550). Even if the photographing is forcedly terminated, all the moving image data before the forced termination are safely saved in the recording medium 22. Thus, the operation for the case where the mode is set to the absolute internal mode is performed.

On the other hand, in the case where the mode is set to the combined use mode in S603, the following operation is performed.

In the case where the mode is set to combined use mode (i.e. relative internal mode or external transfer mode) shown in FIG. 4, when it is decided in S602 that the write pointer W comes close to the read pointer R and the free space of RAM 16 is lessened, CPU 17 decides whether the mode is the combined use mode or not (S603).

When CPU 17 decides that the mode is set to the combined use mode, the operation proceeds to S621. While CPU 17 performs the warning display indicating that the free space in RAM 16 is lessened, CPU 17 performs the display for encouraging the user to prepare the communication I/F 24 to turn on the communication I/F 24. Accordingly, for example, when the communication I/F 24 is USB or IEEE1394, the caution that the USB cable should be connected is called.

In spite of the warning display, when the user does not connect the USB cable and does not turn on the communication I/F 24, CPU 17 decides that the mode is still the relative internal mode shown in FIG. 4 (S622).

Then, CPU 17 monitors whether the write pointer W reaches the read pointer R and the free space in RAM 16 completely has run out or not (S623). When the write pointer W has reached the read pointer R, CPU 17 forces the photographing to terminate (S631), and CPU 17 stops the warning display indicating that the free space in RAM 16 is lessened and the display for encouraging the user to turn on the communication I/F 24 and performs the display indicating that the free space in RAM 16 has run out (S632). Then, CPU 17 stops the display indicating that the free space in RAM 16 has run out (S633) and ends the series of warning displays.

In the case where the free space of RAM 16 is still remains in S623, CPU 17 monitors whether the photographing is completed or not (S624), and CPU 17 repeatedly monitors whether the mode is switched to the external transfer mode (whether the communication I/F is turned on or off) or not, whether one pointer reaches the other pointer or not, and whether the photographing is completed or not, until the photographing is completed (S622, S623, and S624). When the photographing is completed while the free space of RAM 16 is still remains, CPU 17 stops the display for encouraging the user to turn on the communication I/F 24 and ends the series of warning displays.

When the user connects the USB cable and turns on the communication I/F 24 while the CPU 17 repeatedly monitors the three steps of S622, S623, and S624, CPU 17 decides that the mode shifts to the external transfer mode shown in FIG. 4 (S622), and the operation proceeds to S641.

In the flow chart concerning the data transfer shown in FIGS. 5A and 5B which is operated in parallel to the flow chart shown in FIGS. 6A and 6B, the following operation is performed.

While the operation of storing the moving image data in RAM 16 is continued during the photographing, CPU 17 decides whether the mode is external transfer mode or not (S503). At this point, the external transfer mode is currently described, so that the operation proceeds to S504.

In S504, CPU 17 decides whether the first half of the moving image data is transferred to PC 300 or not. In this case, since the first half of the series of moving image data is not transferred to PC 300, the operation proceeds to S505. In S505, CPU 17 monitors whether the photographing is completed or not. The steps from S503 to S505 are repeatedly performed until the photographing is completed. When the photographing is completed, the operation proceeds to S506 and the series of the moving image data from the start of the photographing to the completion is fixed as one moving image file. Even if the photographing is forcedly terminated (S631), the series of the moving image data from the start of the photographing to the forced completion is fixed as one moving image file.

After the moving image file is defined, CPU 17 reads out the moving image data from RAM 16 and transfers the moving image data to the recording medium 22 through the recording medium I/F 23 to write the whole of moving image data of the moving image file in the recording medium 22 (S507). When the operation of writing the moving image data in the recording medium is completed (S508), the stand-alone normal completion is performed in the imaging apparatus 100, and the moving image photographing operation is ended (S550).

Even if the photographing is forcedly terminated, all the moving image data before the forced termination are safely saved in the recording medium 22. Thus, the operation is performed in the case where the mode is set to the relative internal mode.

When the user connects the USB cable and turns on the communication I/F 24 after S621 (or before S621), CPU 17 decides that the mode shifts to the external transfer mode and turns off the warning display (S641). Then, in the warning display system, CUP 17 waits the completion of the photographing (S651 and S650) while repeatedly polling whether the photographing is completed or not (S651) and whether the write pointer W comes close to the read pointer R (S602).

In the data transfer shown in FIGS. 5A and 5B is operated as follows in parallel to the operation of the warning display system shown in FIGS. 6A and 6B.

While the operation of storing the moving image data in RAM 16 is continued during the photographing, the CPU 17 decides whether the mode is the external transfer mode or not (S503). In the case where the mode is not the external transfer mode, the communication I/F has not been turned on since the start of the photographing (S504), and the photographing is continued (S505), the steps from S503 to S505 are repeatedly performed. In S504, CPU 17 decides whether the data transfer to other information equipment has been performed or not. In S505, CPU 17 monitors whether the photographing is completed or not.

When the communication I/F 24 is turned on, since the mode shifts to the external transfer mode according to the flow chart shown in FIG. 4 (S503), the operation proceeds to S511.

In S511, CPU 17 performs the negotiation with PC 300 through the communication I/F 34 and gives the direction to the display unit 20 to display "Now communicating". CUP 17 monitors whether the communication is established or not (S512). When the communication is established, while the photographing operation is continued, CPU 17 stores the moving image data in RAM 16, reads out the moving image data stored in RAM 16 in order from the front end, transfer the moving image data to the communication I/F 24 through the RAM controller 15, and transfer the moving image data to the communication I/F 34 in PC 300 (S513).

Since the photographing operation is continued at the time when the transfer is started, there is the time when the moving image data is sequentially written and stored in RAM 16 through the RAM controller 15 during the transfer. Therefore, there is the time when the write and the readout are simultaneously performed in RAM 16. Similarly to the first embodiment, for access to RAM 16, the write and the readout are time-shared, or RAM 16 is formed to have the dual port to perform the write and the readout at the same time.

Similarly to the first embodiment, in PC 300, the moving image data is sequentially stored in HDD 35 through the main CPU bass 39 after the communication I/F 34 receives the moving image data.

When the transfer of the moving image data to PC 300 is started, CPU 17 confirms whether the photographing is completed or not (S514). When the photographing is completed, CPU 17 monitors whether the transfer of the moving image data from RAM 16 to PC 300 is completed or not (S515). When the transfer is completed and CPU 17 detects the completion (S515), since all the pieces of moving image data has been perfectly transferred, the imaging apparatus 100 gives the command indicating that the transferred moving image data is fixed as one image file through the communication I/F 24.

When PC 300 receives the command, the received moving image data is fixed as one image file in such a manner that CPU 31 analyzes the command and gives the direction to HDD 35 (S516). Then, the completion of the operation is informed back to the imaging apparatus 100. When the imaging apparatus 100 receives the notice of the completion of the operation, the imaging apparatus 100 terminates the communication and turns off the display of Now communicating which is displayed on the display unit 20 since S511 (S517). As a result, the transfer of the moving image data to PC 300 is normally completed, and the moving image photographing operation is ended (S550).

In the case where the photographing is not completed in S514, the operation proceeds to S521, and CPU 17 monitors whether the transfer from RAM 16 to PC 300 is completed or not (S521). At this point, CPU decides that the transfer is completed when the read pointer R reaches the write pointer W. When the transfer of the moving image data stored in RAM 16 is completed, the operation proceeds to S522 while the moving image data is still stored in RAM 16.

The communication is terminated in S522, the display of Now communicating which is displayed on the display unit 20 since S511 is turned off (S521), and the imaging apparatus 100 shifts to the idling state (S523).

At an initial stage in which the imaging apparatus 100 has shifted to the idling state, the moving image data stored in RAM 16 has been transferred to PC 300 in spite of the fact that the photographing is still continued. Therefore, the idling state is continued because the free space in RAM 16 is enough.

In the idling state, it is possible that the external transfer mode shifts to the relative internal mode. That is to say, the communication I/F 24 can be turned off. Therefore, when the display of Now communicating is canceled, the user can remove the USB cable (for example, IEEE1394 cable) for a time.

However, when the idling state lasts for a long time, since the moving image data is stored in RAM 16 again, CPU 17 measures a predetermined period from the start of the idling state (S523 and S524), and the operation returns to S503 after the elapse of the predetermined period.

When the USB cable is removed during the idling state and the external transfer mode shifts to the relative internal mode, the operation proceeds to S504.

In S504, CPU 17 decides whether the first half of the photographed moving image data is transferred to PC 300 or not. In this case, since the first half of the photographed moving image data has once transferred to PC 300, the operation returns to S503. Then, the steps of S503 and S504 are repeated until the operation returns to the external transfer mode again.

During repeating the steps of S503 and S504, the operation of the warning display system shown in FIGS. 6A and 6B waits for the completion of the photographing while repeatedly polling the detection of the completion of the photographing and the approximation of the pointer. When the photographing is completed (S651) without the approach of the pointer (S602), the operation of the warning display system is ended.

When the pointer comes close to the other pointer again, CPU 17 decides that the mode is combined use mode in S603, and CPU 17 performs the display for encouraging the user to prepare the communication I/F 24 to turn on the communication I/F 24 while performing the warning display indicating that the free space in RAM 16 is lessened (S621).

When the communication I/F 24 is not turned on during repeating the steps of S503 and S504, since the moving image data is gradually stored in RAM 16, the warning display in S621 of FIGS. 6A and 6B is performed again. As a result, the user learns that the free space in RAM 16 is lessened and the user can return the mode to the external transfer mode, so that, as shown in the steps from S511, the communication with PC 300 is established again, and the moving image data remaining in RAM 16 is transferred to PC 300.

When the photographing is not completed after the second transfer (S514), the third-time transfer is repeated. It is also possible the transfer is repeated as many times if needed. When the photographing is completed after the second transfer, the moving image data which is transferred before the second transfer is combined with the moving image data which is transferred in the second transfer to fix one file (S516). When the photographing is completed after the third transfer or more, the moving image data which is transferred before the third transfer or more is also combined with the moving image data which is transferred in the third transfer or more to fix one file.

In the warning display shown in FIGS. 6A and 6B, when the user returns the mode to the external transfer mode, CPU 17 turns off the warning display (S641). The operation can be repeated even in the third time or more.

According to the above-described configuration, in the embodiment, even if free space in Ram 16 becomes not enough the during photographing the moving image, the moving image can be also saved as one moving image file without interrupting the continuous moving image.

Further, in the present embodiment, the data transfer system shown in FIGS. 5A and 5B operates independently of the operation of the warning display system shown in FIGS. 6A and 6B, so that the convenience is further improved.

Even if there is no warning display, the user can turn on and off the communication I/F 24 while the Now communicating is not displayed. In other words, the user can connect and disconnect the USB cable at any time.

When PC 300 and the imaging apparatus 100 are previously prepared, the user can disconnect the cable and use the imaging apparatus 100 under the situation which is free from restraint of the cable, while the free space in RAM 16 is enough. When the free space in RAM 16 is not enough, the user can connect the cable to PC 300 and continue to perform the photographing of the moving image under the fixed situation. Therefore, there is a large merit that the photographing of the moving image can be continued without interrupting the continuous moving image.

Third Embodiment

Then, a third embodiment of the invention will be described.

Similarly to the first and second embodiments, FIG. 1 is also used in the third embodiment, so that the second description about FIG. 1 is partly omitted. Unlike the first and second embodiments, the third embodiment has the configuration in which the moving image data sequentially output from the image processing unit 14 is output onto the main CPU bass 29 not through the RAM controller 15 and directly stored in the recording medium 22. Further, the third embodiment has the configuration in which the series of moving image data stored in the recording medium 22 is fixed as one image file when the photographing is completed. The operation in the embodiment will be described below.

Figures 7, 7A, 7B:
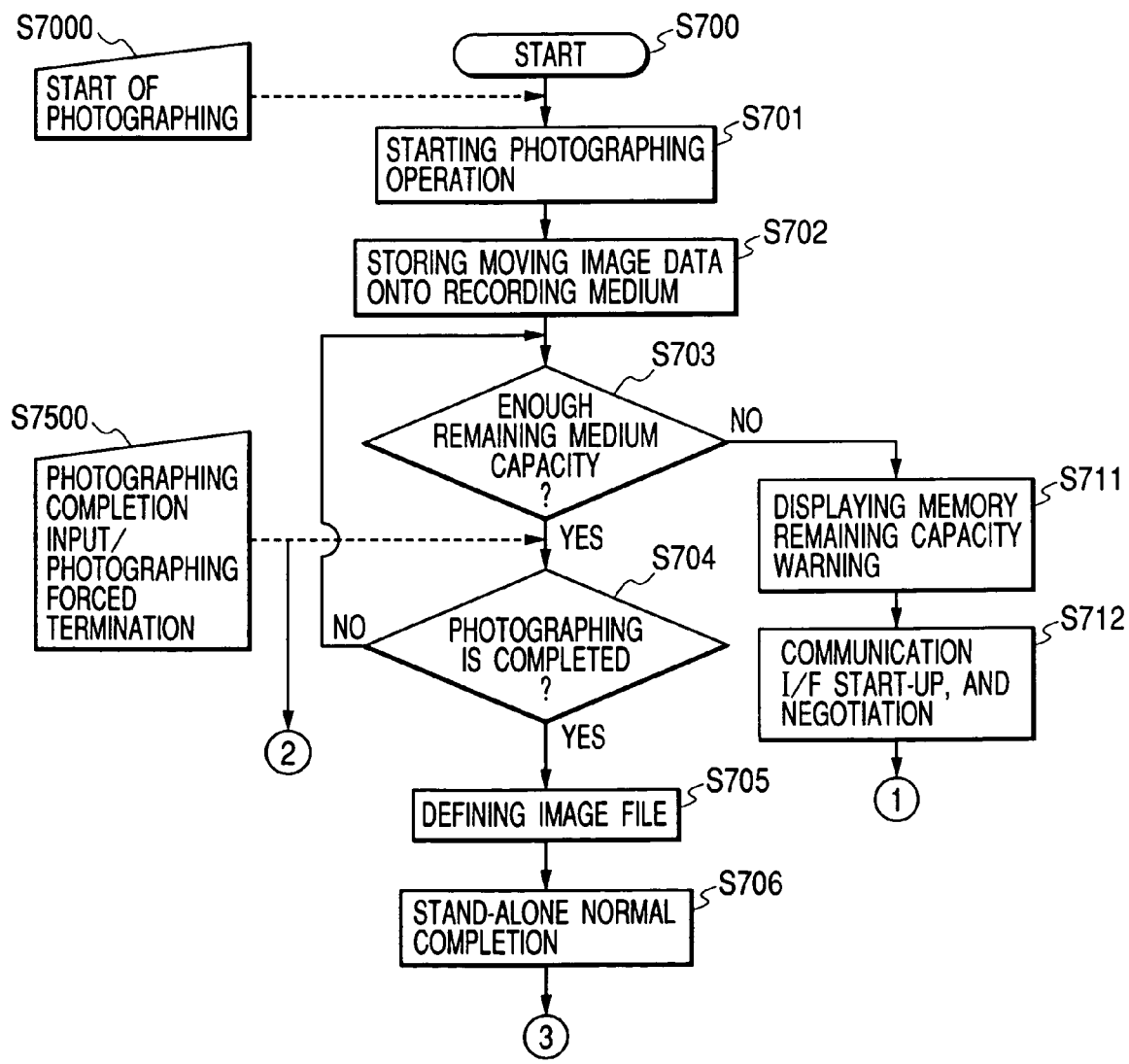
FIG. 7 is comprised of FIGS. 7A and 7B are flow charts showing the operation of the imaging apparatus according to a third embodiment.
Figure 7B:
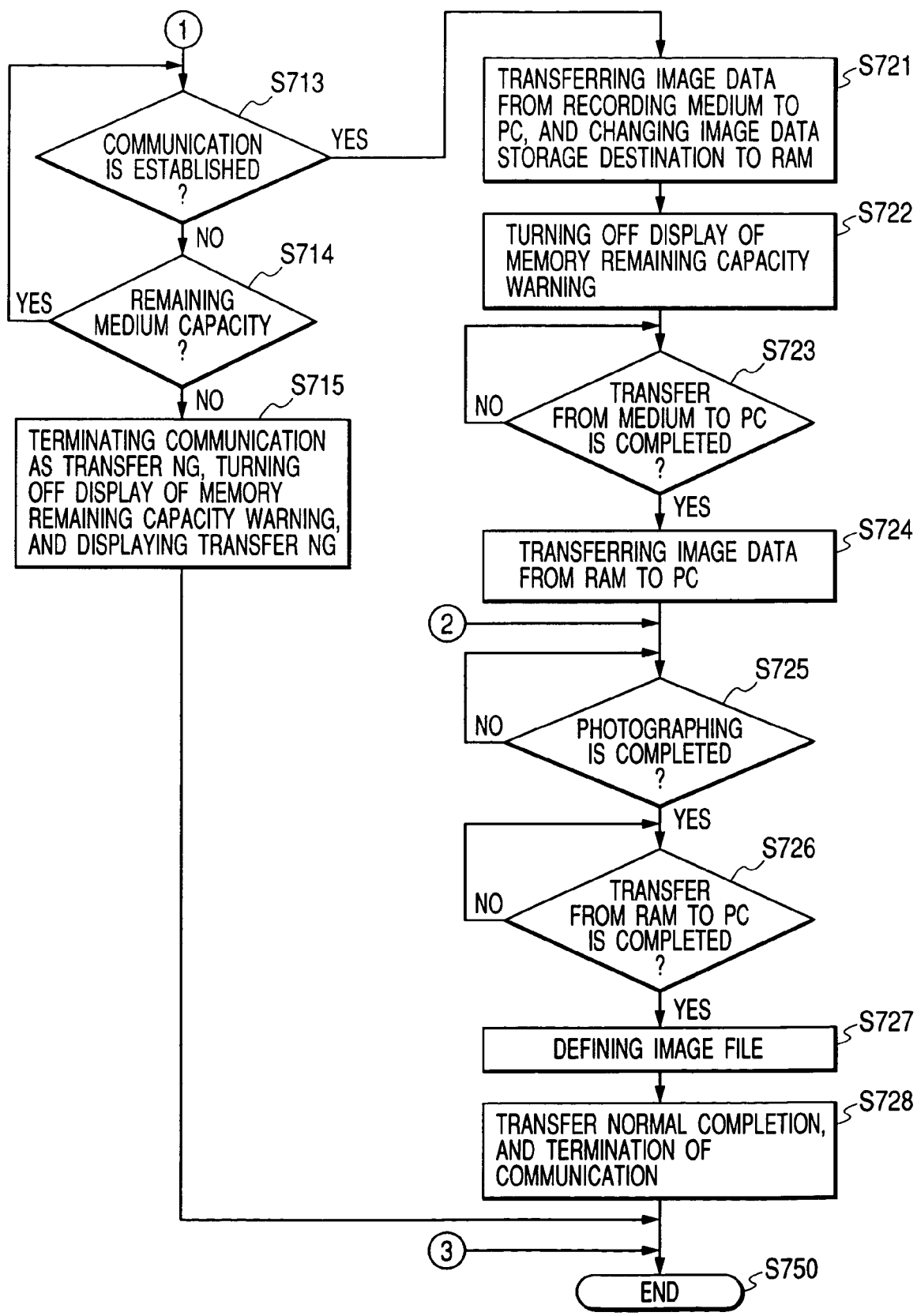

FIGS. 7A and 7B are the flow charts showing the operation in the third embodiment. In the configuration shown in FIG. 1, the operation of the embodiment will be described below by the use of the flow chart shown in FIGS. 7A and 7B.

In FIGS. 7A and 7B, when the user depresses the photographing button (not shown), the photographing start signal is input (S7000) to start the moving image photographing operation (S700 and S701). When the moving image photographing operation is started, the photoelectric conversion of the image of the object image A incident to CCD 12 through the optical system 11 is performed on the each pixel basis by CCD 12, and the converted image is transmitted to the AD conversion unit 13.

The AD conversion unit 13 converts an analog value concerning a shade of each color in each pixel into digital data and transmits the converted data to the image processing unit 14. The image processing unit 14 performs the image processing adaptable to the human visual sense, such as the shading correction and the gamma correction, to the digital image input signal input from the AD conversion unit 13, and the image processing unit 14 converts the digital image input signal into the RGB signal to output. As a result, the moving image data subjected to the image processing is output on the main CPU bass 29 not through the RAM controller 15, and the moving image data is directly written and stored in the recording medium 22 (S702). For example, the imaging apparatus 100 sequentially processes the image at a rate of 30 frames per minute to record the moving image data. The moving image data is continuously output from the image processing unit 14 until the direction of the recording stop is given.

The embodiment has the configuration in which the series of moving image data stored in the recording medium 22 is fixed as one moving image file upon the completion of the photographing.

CPU 17 continues to monitor the free space in RAM 16 while sequentially writing and storing the moving image data into the recording medium 22 in the above-described manner. CPU 17 continues to decide whether there is enough free space in RAM 16 or not (S703).

When CPU 17 decides that there is enough free space in the recording medium 22, CPU 17 decides whether the photographing is completed or not (S704).

When the user depresses the photographing button (not shown) again during photographing the moving image, the photographing completion signal is input (S750). When the storage of the moving image data in the recording medium 22 is completed after the photographing completion signal is input, the photographing completion flag on the hardware circuit (not shown, and initial state is the logic L) is set to the logic H.

CPU 17 can recognize the completion of the photographing by reading the logic H of the photographing completion flag. When CPU 17 recognizes that the photographing is completed, CPU 17 returns the photographing completion flag to the initial state by setting the photographing completion flag to the logic L.

When CPU 17 decides that the photographing of the moving image is not completed, CPU 17 returns the operation to S703. In the case where there is enough free space in the recording medium 22 and the photographing is not completed, the steps of S703 and S704 are repeated.

On the other hand, when CPU 17 decides that the photographing is completed, the series of moving image data stored in the recording medium 22 is fixed as one moving image file (S705). The moving image photographing operation is normally completed (S706) and the moving image photographing operation is ended (S750).

In the case where there is not enough free space in the recording medium 22 before the photographing is completed in S703, CPU 17 issues the warning display indicating that there is not enough free space to the display unit 20 through the display unit I/F 21 (S711). Since the communication means is also the USB cable in the present embodiment, CPU 17 also displays the message that the user is required to connect the USB cable.

Then, CPU 17 starts up the communication I/F 24 through the main CPU bass 29 to start negotiation with PC 300 which is of the connected party (S712). CPU 17 monitors whether the communication is established or not (S713). In the case where the communication is not established, CPU 17 continues to monitor whether the communication is established or not, while CPU 17 decides whether there is still enough free space in the recording medium 22 or not (S714).

In the case where the communication is not established due to disconnection of the USB cable, incompletion of negotiation, or the like when the free space in the recording medium 22 is not enough, the transfer becomes NG. CPU 17 performs display indicating that the transfer can not be performed (S715) while CPU 17 completes the warning display, and the moving image photographing operation is ended (S750)

At this point, for the moving image data stored in the recording medium 22, only the moving image data which has been transferred to the recording medium 22 can be fixed as one moving image file, or the moving image data stored on the recording medium 22 can be also transferred to other information equipment again.

When the USB cable is connected and the negotiation with PC 300 is completed, while the imaging operation is continued, CPU 17 reads out the moving image data stored in the recording medium 22 in order from the front end, transfers the moving image data to the communication I/F 24, and transfers the moving image data to the communication I/F 34 in PC 300 (S721).

At the same time when the readout of the moving image data from the recording medium 22 is started, writing the moving image data output from the image processing unit 14 onto the recording medium 22 is stopped, and then the target storage device in which the moving image data is written is changed to RAM 16 so that the image data is continuously written in RAM 16.

While the moving image data is transferred from the recording medium 22 to the communication I/F 34 through the communication I/F 24, there is the time when the moving image data is sequentially written and stored in RAM 16 through the RAM controller 15, so that there is the time when the writing and the readout of the moving image data are simultaneously performed in RAM 16.

However, at this point, since the moving image data is read out from the recording medium 22 while the moving image data is written in RAM 16, each path of the writing and the readout can divided. Therefore, compared with the first and second embodiments, the readout and the writing can be easily performed at high speed, and sometimes the control system can be also simply formed.

In PC 300, after the communication I/F 34 receives the moving image data, the moving image data is sequentially stored in HDD 35 through the main CPU bass 39.

When the transfer of the moving image data to PC 300 is started, CPU 17 turns off the warning display indicating that the free space is not enough (S722). Then, CPU 17 polls whether the transfer of the moving image data from the recording medium 22 to PC 300 is perfectly completed or not (S723).

When the transfer of the moving image data is completed, the remaining moving image data is started from RAM 16, to which the storage of the moving image data has been changed, to PC 300 (S724). When the transfer is started, similarly to S704, CPU 17 decides whether the photographing is completed or not (S725). When CPU decides that the photographing is completed, CPU 17 polls whether the transfer of the moving image data from RAM 16 to PC 300 is perfectly completed or not (S726).

When the transfer of the moving image data is completed, CPU 17 gives the command for fixing the transferred moving image data as one image file through the communication I/F 24.

When PC 300 receives the command, the received moving image data is fixed as one image file in such a manner that CPU 31 analyzes the command and gives the direction to HDD 35 (S727). Then, the completion of the operation is returned to the imaging apparatus 100. As a result, the transfer of the moving image data to PC 300 is normally completed (S728), and the moving image photographing operation is ended (S750).

According to the above-described configuration, the present embodiment can provide the imaging apparatus in which the moving image can be saved as one moving image file without interrupting the continuous moving image even if the free space in the storing means becomes not enough during photographing the moving image, so that it is very useful.

At the time when the readout and the writing of the moving image data are simultaneously performed, the moving image data is written in RAM 16 and the moving image data is read out from the recording medium 22, so that each path of the readout and the writing can be separated. Therefore, compared with the first and second embodiments, the third embodiment has the new merit in which the readout and the writing can be easily performed at high speed and sometimes the control system can be also simply formed.

Fourth Embodiment

Then, a fourth embodiment of the invention will be described.

Similarly to the first to third embodiments, FIG. 1 is also used in the fourth embodiment, so that the second description about FIG. 1 is partly omitted. Similarly to the third embodiment, the fourth embodiment has the configuration in which the moving image data sequentially output from the image processing unit 14 is output on the main CPU bass 29 not through the RAM controller 15 and directly stored in the recording medium 22.

Further, similarly to the third embodiment, the fourth embodiment has the configuration in which the series of moving image data stored in the recording medium 22 is fixed as one image file when the photographing is completed.

Similarly to the second embodiment, in the memory address management of RAM 16, the fourth embodiment also has the ring buffer configuration shown in FIG. 3. Since the ring buffer in the fourth embodiment has the same configuration as the second embodiment, the description is omitted. However, FIG. 3 is partially used in the following description. Although the ring buffer configuration is used in the present embodiment, needless to say, the non-use of the ring buffer configuration is not deviated from the scope of the invention. The ring buffer configuration can be also used in the third embodiment. In this case, the use of the ring buffer configuration is not also deviated from the scope of the invention.

Further, it is understood that the mode setting method in the second embodiment shown in FIG. 4 can be directly applied to the fourth embodiment. Since the mode setting is similar to that of the second embodiment, the description is omitted. Similarly to the second embodiment, the absolute internal mode is not always required, and the case in which the absolute internal mode is absent can be also included within the range of the technical thought of the invention.

FIGS. 4, 8A, 8B, 9A, 9B and 9C are the flow chart of the operation in the fourth embodiment. All FIGS. 4, 8A, 8B, 9A, 9B and 9C are described, and each of the flow charts shown in FIGS. 8A, 8B, 9A, 9B and 9C is described in parallel.

Figure 8B:
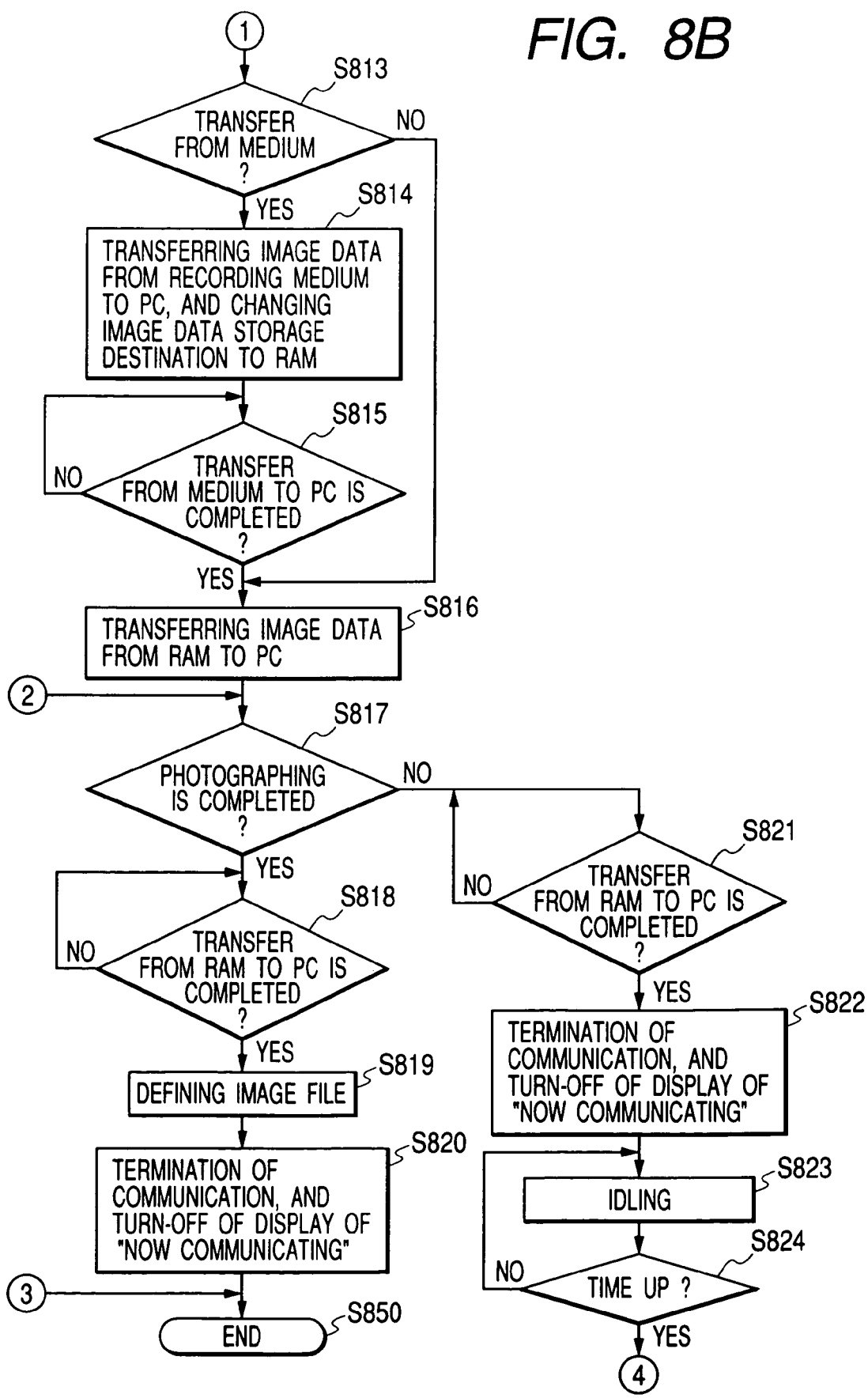
FIG. 8 is comprised of FIGS. 8A and 8B are flow charts showing the operation of the imaging apparatus according to a fourth embodiment.
Figure 9C:
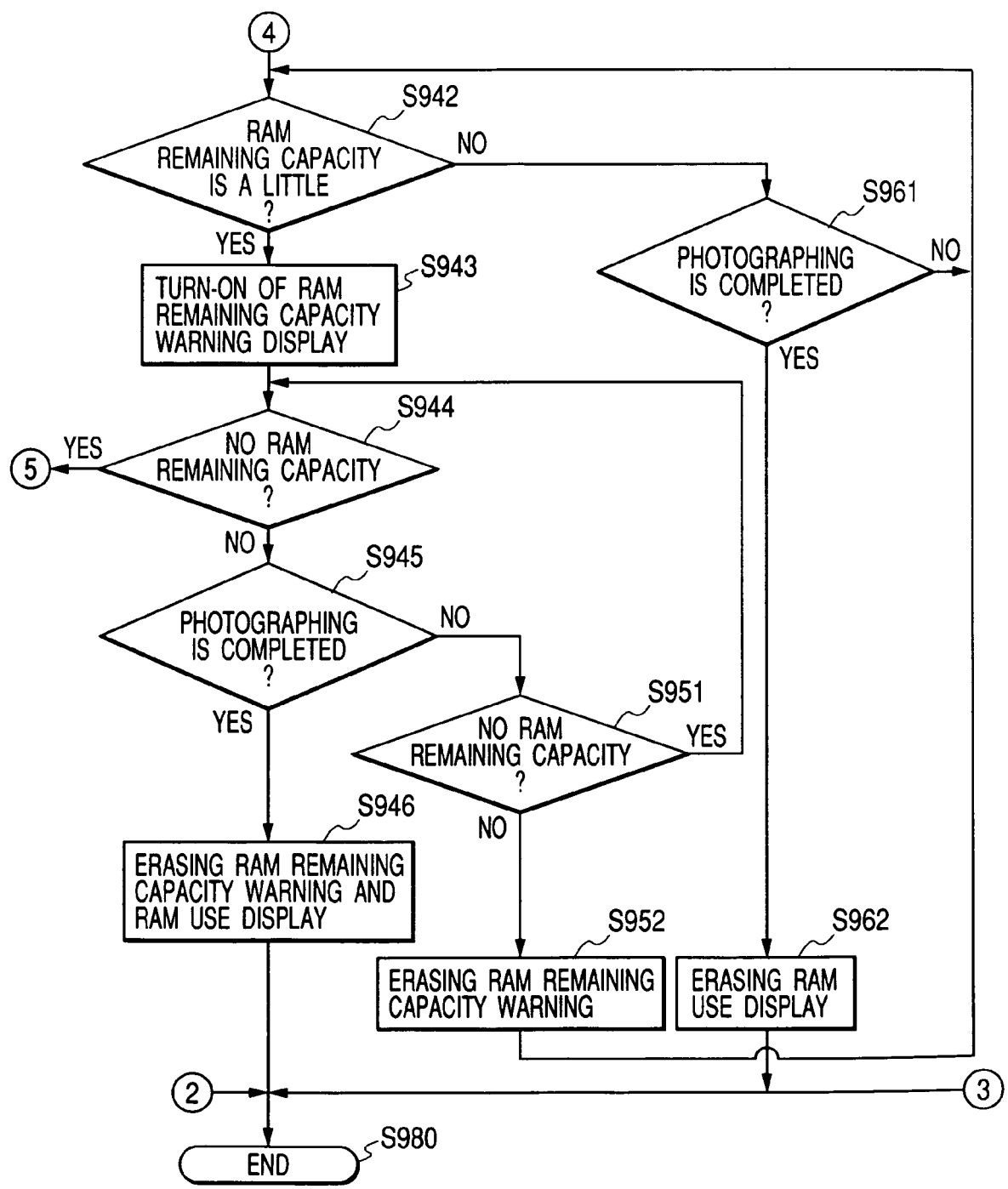
FIG. 9 is comprised of FIGS. 9A, 9B and 9C are flow charts showing operation of the imaging apparatus according to the fourth embodiment.

FIGS. 8A and 8B are flow charts concerning the data transfer in the embodiment, and FIGS. 9A, 9B and 9C are flow charts concerning the warning display in the embodiment. In the embodiment, these flow charts are operated in parallel. The following description will be performed by the use of the flow charts shown in FIGS. 8A, 8B, 9A, 9B and 9C.

When the user depresses the photographing button (not shown), the photographing start signal is input (S8000) to start moving image photographing operation (S800 and S801). The embodiment also has the configuration in which the moving image data subjected to the image processing is output on the main CPU bass 29 not through the RAM controller 15, directly written and stored on the recording medium 22, and fixed as one moving image file with completion of the photographing. The moving image data output from the image processing unit 14 is continuously stored on the recording medium 22 (S802).

The flow chart concerning the warning display in FIGS. 9A, 9B and 9C can be executed only during the photographing (S900, S901, and S950). When the photographing operation is started, CPU 17 monitors whether the free space in the recording medium 22 is enough or not (S902).

In S902, when CPU 17 decides that the free space in the recording medium 22 is enough, CPU 17 confirms whether the photographing is completed or not (S971). When CPU 17 decides that the photographing is not completed, CPU 17 repeatedly decides whether the free space on the recording medium 22 is enough or not and repeatedly confirms whether the photographing is completed or not.

Since the following operation depends on the mode setting described in FIG. 4, the description will be done in each mode.

At first, the case in which the mode is set to the absolute internal mode will be described.

In FIGS. 9A, 9B and 9C, when the free space of the recording medium 22 is lessened, CPU 17 confirms whether the mode is the combined use mode or not (S903). In the case of the absolute internal mode, the operation proceeds to S904, and CPU 17 performs the warning display indicating that the free space in the recording medium 22 is lessened.

Then, CPU 17 monitors whether the free space in the recording medium 22 completely has run out or not (S905). When the free space on the recording medium 22 has perfectly run out, CPU 17 forces the photographing to terminate (S911), and CPU 17 stops the warning display indicating that the free space in the recording medium 22 is lessened and performs the display indicating that the free space in the recording medium 22 is has run out (S912).

Then, CPU 17 stops the display indicating that the free space on the recording medium 22 has run out (S913) and ends the series of warning displays. In the case where the free space of the recording medium 22 is still remains in S905, CPU 17 monitors whether the photographing is completed or not (S906), and CPU 17 repeatedly checks whether the free space of the recording medium 22 is enough or not and whether the photographing is completed or not, until the photographing is completed. When the photographing is completed while the free space of the recording medium 22 is still remains, CPU 17 stops the warning display indicating that the free space in the recording medium 22 is lessened (S907) and ends the series of warning displays.

In this case, the following operation is performed in the flow chart concerning the data transfer in FIGS. 8A and 8B.

While the photographed moving image data is stored on the recording medium 22 (S802), CPU 17 decides whether the mode is the external transfer mode or not (S803). At this point, the absolute internal mode is currently described, so that the operation proceeds to S804. In S804, after CPU 17 transfers the first half of the moving image data to PC 300, CPU 17 decides whether the storage device of the moving image data is changed from the recording medium 22 to RAM 16 and the moving image data is being stored in RAM 16 or not. In this case, since the first half of the moving image data is not transferred to PC 300, the operation proceeds to S805.

In S805, CPU 17 monitors whether the photographing is completed or not. The steps from S803 to S805 are repeatedly performed until the photographing is completed. Regardless of whether the photographing is terminated forcedly or normally, when the photographing is completed, the operation proceeds to S806 and the series of the moving image data from the start of the photographing to the completion is fixed as one moving image file on the recording medium 22.

Even if the photographing is forcedly terminated, the moving image data from the start of the photographing to the forced completion is similarly fixed as one moving image file on the recording medium 22. After the moving image file is fixed, the moving image photographing operation is completed in the imaging apparatus 100 by itself, and the moving image photographing operation is ended (S850). Even if the photographing is forcedly terminated, all the moving image data before the forced termination are safely saved in the recording medium 22. Thus, the operation in the case where the mode is set to the absolute internal mode is performed.

On the other hand, in the case where the mode is set to the combined use mode, CPU 17 decides that the mode is the combined use mode (S903), and the following operation is performed according to the decision.

In the case where the mode is set to combined use mode (i.e. relative internal mode or external transfer mode) shown in FIG. 4, when CPU 17 decides that the free space of the recording medium 22 is lessened in S902, CPU 17 decides whether the mode is set to the combined use mode or not (S903). When CPU 17 decides that the mode is set to the combined use mode, the operation proceeds to S921. While CPU 17 performs the warning display indicating that the free space the recording medium 22 is lessened, CPU 17 performs the display for encouraging the user to prepare the communication I/F 24 to turn on the communication I/F 24 (S921). For example, when the communication I/F 24 is USB or IEEE1394, the caution that the USB cable should be connected is called.

In spite of the warning display, when the user does not connect the USB cable and does not turn on the communication I/F 24, CPU 17 decides that the mode is still the relative internal mode (S922). Then, in the relative internal mode, CPU 17 monitors whether the free space of the recording medium 22 completely has run out or not (S923).

When the free space of the recording medium 22 completely has run out, CPU 17 forces the photographing to terminate (S931), and CPU 17 stops the warning display indicating that the free space of the recording medium 22 is lessened and the display for encouraging the user to turn on the communication I/F 24 and performs the display indicating that the free space of the recording medium 22 is has run out (S932). Then, CPU 17 stops the display indicating that the free space of the recording medium 22 has run out (S933) and ends the series of warning displays.

In the case where the free space of the recording medium 22 is still remains in S923, CPU 17 monitors whether the photographing is completed or not (S924), and CPU 17 repeatedly monitors whether the mode is switched to the external transfer mode (whether the communication I/F is turned on or off) or not, whether one pointer reaches the other pointer or not, and whether the photographing is completed or not, until the photographing is completed (S922, S923, and S924). When the photographing is completed while the free space of the recording medium 22 is still remains, CPU 17 stops the warning display indicating that the free space of the recording medium 22 is lessened and the display for encouraging the user to turn on the communication I/F 24 and ends the series of warning displays.

If the user connects the USB cable and turns on the communication I/F 24 while the CPU 17 repeatedly monitors the three steps of S922, S923 and S924, since this indicates that the mode shifts to the external transfer mode, then the operation proceeds to S941.

In the flow chart concerning the data transfer shown in FIGS. 8A and 8B which is operated in parallel to the flow chart shown in FIGS. 9A, 9B and 9C, the following operation is performed.

While the operation of storing the moving image data in the recording medium 22 is continued (S802), CPU 17 decides whether the mode is external transfer mode or not (S803). At this point, the external transfer mode is currently described, so that the operation proceeds to S804.

In S804, after the first half of the moving image data is transferred to PC 300, CPU 17 decides whether the storage device of the moving image data is changed from the recording medium 22 to RAM 16 and the moving image data is being stored in RAM 16 or not. In this case, since the first half of the moving image data is not transferred to PC 300, the operation proceeds to S805. In S805, CPU 17 monitors whether the photographing is completed or not. The steps from S803 to S805 are repeatedly performed until the photographing is completed.

Regardless of whether the photographing is completed forcedly or normally, when the photographing is completed, the operation proceeds to S806, and the series of the moving image data from the start of the photographing to the completion is fixed as one moving image file on the recording medium 22 (S806). Even if the photographing is forcedly terminated, the moving image data from the start of the photographing to the forced termination is similarly fixed as one moving image file on the recording medium 22. After the moving image file is fixed, the moving image photographing operation is completed in the imaging apparatus 100 by itself, and the moving image photographing operation is ended (S850).

Even if the photographing is forcedly terminated, all the moving image data before the forced termination are safely saved on the recording medium 22. Thus, the operation in the case where the mode is set to the absolute internal mode is performed.

The case in which, after S621 (or before S621), the user connects the USB cable to turn on the communication I/F 24 to enter the external transfer mode, will be explained.

At this point, as described later, CPU 17 changes the target storage device of the moving image data from the recording medium 22 to RAM 16 (S814) and performs the display indicating that the moving image data is being stored in RAM 16 (S941), while CPU 17 decides that the mode shifts to the external transfer mode (S922) and turns off the warning display (S941). Then, CUP 17 waits the completion of the photographing while repeatedly polling whether the photographing is completed or not and whether one pointer comes close to the other pointer (S961 and S950).

The data transfer system shown in FIGS. 8A and 8B is operated as follows in parallel to the operation of the warning display system shown in FIGS. 9A, 9B and 9C.

While the photographing of the moving image data is performed, the CPU 17 decides whether the mode is the external transfer mode or not (S803). In the case where the mode is not the external transfer mode, CPU 17 decides whether the photographed moving image data is being stored in RAM 16 or not (S804). That is, after the free space of the recording medium 22 is lessened and the moving image data stored on the recording medium 22 is transferred by PC 300, and then CPU 17 decides whether the target storage device of the moving image data has been changed from the recording medium 22 to RAM 16 nor not. In the case where the target storage device of the moving image data is the recording medium 22, CPU 17 decides whether the photographing is completed or not (S805), the steps of S804 and S805 are repeatedly performed.

When the user connects the USB cable to turn on the communication I/F 24 in S803, since the mode shifts to the external transfer mode, the operation proceeds to S811.

In S811, CPU 17 performs the negotiation with PC 300 through the communication I/F 34 and gives the direction to the display unit 20 to display Now communicating. CUP 17 monitors whether the communication is established or not (S812). When the communication is established, the operation proceeds to S813. In S813, CPU 17 decides whether the target storage device of the moving image data is the recording medium 22 or RAM 16. Since the moving image data is stored in the recording medium 22 at the early stage of the photographing, the operation proceeds to S814.

In S814, while the photographing operation is continued, CPU 17 reads out the image data stored on the recording medium 22 in order from the front end and transfers the read-out moving image data to the communication I/F 34 through the communication I/F 24.

At the same time when the readout of the moving image data from the recording medium 22 is started, the writing the moving image data output from the image processing unit 14 onto the recording medium 22 is stopped, and then the target storage device in which the moving image data is written is changed to RAM 16 so that the moving image data is continuously written in RAM 16.

While the moving image data is transferred from the recording medium 22 to the communication I/F 34 in PC 300 through the communication I/F 24, there is the time when the moving image data is sequentially written and stored in RAM 16 through the RAM controller 15, so that there is the time when the write and the readout of the moving image data are simultaneously performed in RAM 16.

However, at this point, since the moving image data is read out from the recording medium 22 while the moving image data is written in RAM 16, each path of the write and the readout can be separated. Therefore, similarly to the third embodiment, the readout and the write can be easily performed at high speed and sometimes the control system can be also simply formed, compared with the first and second embodiments.

Similarly to the third embodiment, in PC 300, the moving image data is sequentially stored on HDD 35 through the main CPU bass 39 after the communication I/F 34 receives the moving image data.

When the transfer of the moving image data from the recording medium 22 to PC 300 is started, CPU 17 monitors whether the transfer is completed or not (S815). When the transfer of the moving image data from the recording medium 22 to PC 300 is completed and CPU 17 detects the completion of the transfer (S815), the operation proceeds to photographing completion detection steps.

Since the transfer of the moving image data from the recording medium 22 to PC 300 is completed, the moving image data from RAM 16 to PC 300 is transferred in S816.

While the moving image data is continuously stored in RAM 16 (However, the storing operation is completed at this point), CPU 17 reads out the moving image data stored in RAM 16 in order from the front end (At this point, a portion of the moving image data subsequent to the moving image data which is previously stored in the recording medium 22 and transferred to PC 300), transfers the read-out moving image data to the communication I/F 24 through the RAM controller 15, and transfers the moving image data to the communication I/F 34 in PC 300.

Since the photographing operation is continued at the time when the transfer is being performed, there is the time when the moving image data is sequentially written and stored in RAM 16 through the RAM controller 15 during the transfer. Therefore, there is the time when the write and the readout are simultaneously performed in RAM 16. Similarly to the second embodiment, for access to RAM 16, the write and the readout are time-shared, or RAM 16 is formed to have the dual port to perform the write and the readout at the same time.

Similarly to the third embodiment, in PC 300, the moving image data is sequentially stored on HDD 35 through the main CPU bass 39 after the communication I/F 34 receives the moving image data.

When the transfer of the moving image data to PC 300 is started, the operation proceeds to the photographing completion detection step (S817). In S817, CPU 17 confirms whether the photographing is completed or not. When the photographing is completed, CPU 17 monitors whether the transfer of the moving image data from RAM 16 to PC 300 is completed or not (S818). When the transfer of the moving image data from RAM 16 to PC 300 is completed and CPU 17 detects the completion of the transfer, since all the moving image data have been perfectly transferred to PC 300, CPU 17 gives the command indicating that the transferred moving image data is fixed as one image file through the communication I/F 24.

When PC 300 receives this command, the received moving image data is fixed as one image file in such a manner that CPU 31 analyzes the command and gives the direction to HDD 35 (S819). Then, the completion of the operation is notified back to the imaging apparatus 100. When the imaging apparatus 100 receives this notice, the imaging apparatus 100 terminates the communication and turns off the display of Now communicating which is displayed on the display unit 20 since S811 (S820). As a result, the transfer of the moving image data is normally completed, and the moving image photographing operation is ended (S850).

In the case where the photographing is not completed in S817, the operation proceeds to S821, and CPU 17 monitors whether the transfer from RAM 16 to PC 300 is completed or not. At this point, in the embodiment, it is understood that a transfer rate of the moving image data through the communication I/F 24 is faster than a write rate of the moving image data in RAM 16. Therefore, in S817, CPU decides that the transfer is completed at the time when the read pointer R of RAM 16 reaches the write pointer W and the operation proceeds to S822. If the direction to stop the photographing is not given thereafter, the moving image data is stored in RAM 16 again.

The communication is terminated in S822, the display of Now communicating is turned off, and the imaging apparatus 100 shifts to the idling state (S823). At the initial stage in which the imaging apparatus 100 has shifted to the idling state, the moving image data stored in RAM 16 has been transferred to PC 300 in spite of the fact that the photographing is still continued. Therefore, the idling state is continued because the free space of RAM 16 in the imaging apparatus 100 is enough.

In the idling state, it is possible that the external transfer mode shifts to the relative internal mode.

That is to say, the communication I/F 24 can be also turned off. Therefore, when the display of "Now communicating" is canceled, the user can remove the USB cable (for example, IEEE1394 cable) for a time.

However, when the idling state lasts for a long time, since the moving image data is stored in RAM 16 again, CPU 17 measures a predetermined period from the start of the idling state (S823 and S824), the operation returns to S803 after the elapse of the predetermined period, and CPU 17 decides whether the mode is the external transfer mode or not.

When the USB cable is removed during the idling state and the external transfer mode shifts to the relative internal mode, the operation proceeds to S804. In S804, CPU 17 decides whether the first half of the moving image data currently being photographed is transferred to PC 300 or not. In other words, in S804, CPU 17 detects that the moving image data being photographed has experienced in transfer of the first half thereof to PC 300.

That is to say, CPU 17 decides whether the target storage device of the moving image data is changed to RAM 16 or not after the first half of the moving image data being photographed now is transferred to PC 300. At this point, there is the experience in which the first half of the photographed moving image data has transferred to PC 300, and the moving image data is being stored in RAM 16, so that the operation returns to S803. Then, the steps of S803 and S804 are repeated until the operation returns to the external transfer mode again.

During repeating the steps of S803 and S804, the operation of the warning display system shown in FIGS. 6A and 6B waits for the completion of the photographing while repeatedly polling the detection of the completion of the photographing and the approximation of the pointer (S961 and S942). When the photographing is completed without decreasing the free space of RAM 16, CPU 17 turns off the display of the use of RAM 16 (S962), and the operation of the warning display system is ended (S950).

When the free space of RAM 16 is decreased, CPU 17 performs the display for encouraging the user to prepare the communication I/F 24 to turn on the communication I/F 24 while performing the warning display indicating that the free space in RAM 16 is lessened (S943).

Now returning to FIGS. 8A and 8B, when the communication I/F 24 is not turned on during repeating the steps of S803 and S 804, since the moving image data is gradually stored in RAM 16, the warning display in S943 of FIGS. 9A, 9B and 9C is performed again. As a result, since the user learns that the free space in RAM 16 is lessened and the user can return the mode to the external transfer mode, as shown in the steps from S811, the communication with PC 300 is established again, and the moving image data remaining in RAM 16 is transferred to PC 300.

In the second and subsequent transfer, although CPU 17 decides whether the target storage device of the moving image data to be transferred is the recording medium 22 or RAM 16 in S813, since the target storage device of the moving image data has changed to RAM 16, the operation proceeds to S814 unlike the first transfer.

When the photographing is not yet completed after the second transfer (S817), the third transfer is repeated. When the photographing is completed in the second transfer. In S819, the moving image data which is transferred before the second transfer is combined with the moving image data which is transferred in the second transfer to fix one file. When the photographing is completed after the third transfer or more, the moving image data which is transferred before the third transfer or more is also combined with the moving image data which is transferred in the third transfer or more to fix one file.

In FIGS. 9A, 9B and 9C, the steps from S943 are operated as follows. CPU 17 polls whether the free space of RAM 16 has run out or not (S944). When the free space of RAM 16 has run out, the operation flies to S931 and the photographing is forcedly terminated. Then, CPU 17 stops the warning display indicating that the free space of RAM 16 is not enough, the display for encouraging the user to prepare the communication I/F 24 to turn on the communication I/F 24, and the display of the use of RAM 16, and CPU 17 displays that the free space of the recording medium 22 has run out (S932). Then, CPU 17 terminates the display indicating that the free space of the recording medium 22 has run out (S933), and the series of the warning displays are completed.

In S944, when the photographing is completed while the free space has not run out, CPU 17 turns off the warning display indicating that the free space of RAM 16 is not enough, the display for encouraging the user to prepare the communication I/F 24 to turn on the communication I/F 24, and the display of the use of RAM 16 (S946), and the series of the warning displays are completed.

In S945, when the photographing is not completed, CPU 17 decides whether the free space of RAM 16 is enough or not (S951). When the free space of RAM 16 is recovered after the moving image data is transferred, CPU 17 turns off the warning display indicating that the free space of RAM 16 is not enough, and the operation returns to S942 again. When the free space of RAM 16 is not enough, the operation returns to S944. The embodiment has the above-described configuration, so that the operation can be also repeated more than three times.

According to the above-described configuration, the embodiment can provide the imaging apparatus in which the moving image can be saved as one moving image file without interrupting the continuous moving image even if the free space in the storing means becomes not enough during photographing the moving image, so that it is very useful.

Further, in the embodiment, the data transfer system shown in FIGS. 5A and 5B operates independently of the operation of the warning display system shown in FIGS. 6A and 6B, so that the convenience is further improved. Even if there is no warning display, the user can turn on and off the communication I/F 24 while the Now communicating is not displayed. In other words, the user can connect and disconnect the USB cable at any time. When PC 300 and the imaging apparatus 100 are previously prepared, the user can disconnect the cable and use the imaging apparatus 100 under the situation which is free from restraint of the cable, while the free space in RAM 16 is enough. When the free space in RAM 16 is not enough, the user can connect the cable to PC 300 and continue to perform the photographing of the moving image under the fixed situation. Therefore, there is a large merit that the photographing of the moving image can be continued without interrupting the continuous moving image.

At the time when the readout and the write of the moving image data are simultaneously performed, the moving image data is written in RAM 16 and the moving image data is read out from the recording medium 22, so that each path of the readout and the write can be separated. Therefore, compared with the first and second embodiments, the embodiment has the new merit in which the readout and the write can be easily performed at high speed and sometimes the control system can be also simply formed.

Fifth Embodiment

The first to fourth embodiments were described above. In these embodiments, for the communicating means, the hardwire communicating means such as USB and IEEE1394 was described. However, as shown in FIG. 10, communicating means 500 can be formed by wireless communication. For example, a BIUETOOTH standard in which a radio wave is used, an IrDA standard in which infrared is used or the like can be cited as an example of the wireless communication.

Other Embodiments

Although the mode in which the moving image data is collectively transferred to the recording medium 22 after the moving image data is once stored in RAM 16 was shown in the first and second embodiments, it is also possible that the moving image data is configured to be continuously saved in RAM 16. RAM 16 and the recording medium 22 in the imaging apparatus 100 are provided as the target storage device for the moving image data. However, one device such as RAM 16 or at least three devices can be provided to transfer the moving image data.

In each embodiment, the file may be transferred to PC 300 while the file is divided into two files, one for the case where the communication of the moving image data is disable and the other for the case where the communication of the moving image data is enable (or in each connection of the communication cable). These two (or more) files can be concatenated to form one continuous moving image file by the command of the user to PC 300.

In the imaging apparatus having continuous shooting, sometimes the continuous shooting function can be defined as the moving image photographing function in broader meaning, and sometimes the series of photographed image information can be defined as the image information of the moving image. Other various variations can be possible in the invention.

As described above, the invention can provide the image pickup system having a large advantage, and it is very useful. When the advantage of the invention is described, the invention can provide the image pickup system in which the moving image can be saved as one moving image file without interrupting the continuous moving image even if the free space in the storing means becomes not enough during photographing the moving image.

The object of the invention can be also achieved in such a manner that the recording medium on which program code of software for realizing the functions of the above-described embodiments is recorded is supplied to the system or the apparatus and the computer (or CPU or MPU) in the system or the apparatus reads out and executes the program code stored in the recording medium.

In this case, the program code by itself read out from the recording medium realizes the functions of the above-described embodiments, and the program code itself and the recording medium storing the program code can constitute the invention.

For example, a flexible disk, a hard disk drive, an optical disk, a magneto-optical disk, CD-ROM, CD-R, magnetic tape, a non-volatile memory card, ROM can be used as the recording medium for supplying the program code.

The invention includes not only the case in which the functions of the above-described embodiments are realized by executing the program code read out by the computer, but also the case in which OS (basic system or operating system) running on the computer performs a part of the actual processing or the whole actual processing on the basis of the direction of the program code and the function of the above-described embodiment are realized by the processing.

Further, the invention includes the case in which, after the program code read out from the recording medium is written in the memory which is provided in a function enhancement board inserted in the computer or a function enhancement unit connected to the computer, CPU or the like included in the function enhancement board or the function enhancement unit performs a part of the actual processing or the whole actual processing on the basis of the direction of the program code and the function of the above-described embodiment are realized by the processing.

Many widely different embodiments of the present invention may be constructed without departing from the spirit and scope of the present invention. It should be understood that the present invention is not limited to the specific embodiments described in the specification, except as defined in the appended claims.

What is claimed is:

1. An imaging apparatus comprising:
   image pickup means;
   storing means for storing moving image data of a moving image photographed by said image pickup means on a storage medium according to a photographing start instruction;
   detecting means for detecting whether free space of a storage capacity of the storage medium is not enough;
   communicating means for transmitting the moving image data to an external device; and
   controlling means for controlling said image pickup means and said communicating means according to said detecting means detecting that the free space of the storage capacity of the storage medium is not enough during photographing the moving image so as to start to transmit the stored moving image data of the moving image being photographed after the photographing start instruction to the external device, while continuing photographing the moving image.

2. An apparatus according to claim 1, wherein said controlling means further controls said communicating means so that said communicating means outputs a control signal for saving the moving image data transferred to the external device as one file in case of transmission operation of the series of moving image data.

3. An apparatus according to claim 1, wherein said controlling means controls said storing means so that said storing means continues to store the moving image data obtained by said image pickup means even after starting the transmission of the moving image data.

4. An apparatus according to claim 1, wherein said controlling means displays information for directing connection between the external device and said communicating means on a display device according to said detecting means detecting that the free space of the storage capacity of the storage medium is not enough, in the case where the external device and said communicating means are not connected to each other through a transmission line.

5. An apparatus according to claim 4, wherein said controlling means controls said image pickup means and said communicating means so that photographing is stopped without transmitting the moving image data to the external device, in the case where, even after the said detecting means detects that the free space of the storage capacity of the storage medium is not enough, the external device and said communicating means are not connected and the free space of the storage medium has run out.

6. An apparatus according to claim 1, wherein said controlling means displays information for showing that the transmission of the moving image data is started on the display device according to said detecting means detecting that the free space of the storage capacity of the storage medium is not enough.

7. An apparatus according to claim 1, further comprising:
   directing means for directing stop of photographing; and
   writing means for reading out the moving image data stored on the storage medium and writing the read-out moving image data in a storage device,
   wherein said controlling means controls said writing means so that said writing means saves the moving image data stored on the storage medium during a period from the photographing start instruction of the moving image to the stop of photographing as one file in the storage device, in the case where a direction of the stop of photographing is given from said directing means without receiving a detecting result that the free space of the storage capacity of the storage medium is not enough from said detecting means after the photographing start instruction.

8. An apparatus according to claim 1, further comprising directing means for directing stop of photographing,
   wherein said controlling means controls said storing means so that said storing means saves the moving image data stored on the storage medium during a period from the photographing start instruction of the moving image to the stop of photographing as one file, in the case where a direction of the stop of photographing is given from said directing means without receiving a detection result that the free space of the storage capacity of the storage medium is not enough from said detecting means after the photographing start instruction.

9. An apparatus according to claim 1, wherein said storing means includes a memory interface which controls write and readout of the moving image data to the storage medium and the storage device different from the storage medium and said controlling means controls said storing means and said communicating means so that when said detecting means detects that the free space is not enough during storing the photographed moving image data into the storage medium, the moving image data is written in the storage device while switching from the storage medium to the storage device and transmission of the moving image data stored in the storage medium to the external device is started.

10. An apparatus according to claim 1, wherein said communicating means transmits the moving image data at a rate faster than a data rate of the moving image data output from said image pickup means, said controlling means controls said communicating means so that after starting the transmission to the external device, the transmission is stopped in response to completion of the transmission of the moving image data of an amount corresponding to timing of detection of that the free space of the storage capacity of the storage medium is not enough by said detecting means.

11. An apparatus according to claim 10, wherein said controlling means further controls said communicating means so that after stopping the transmission of the moving image data, transmission of the moving image data stored in the storage medium to the external device is started in response to reception of a detection result that the free space of the storage capacity of the storage medium is not enough from said detecting means again.

12. An imaging apparatus comprising:
   image pickup means;
   a memory interface for writing moving image data of a moving image photographed with said image pickup means in a memory according to a photographing start instruction and reading out the moving image data from the memory;
   writing means for writing the moving image data in a storage device;
   detecting means for detecting whether free space of a storage capacity of the memory is not enough;
   communicating means for transmitting the moving image data stored in at least one of the memory and the storage device to an external device; and
   controlling means for according to said detecting means detecting that the free space of the storage capacity of the memory is not enough during photographing the moving image, starting to transmit the moving image data of the moving image stored in the memory after the photographing start instruction to the external device while photographing the moving image and switching writing of the moving image data output from said image pickup means from the memory to the storage device.

13. An image data processing system comprising:

image pickup means;

storing means for storing moving image data of a moving image photographed with said image pickup means on a storage medium in accordance with a photographing start instruction;

detecting means for detecting whether free space of a storage capacity of the storage medium is not enough;

communicating means for transmitting the moving image data through a transmission line;

controlling means for controlling said image pickup means and said communicating means to start transmission of the moving image data of the moving image stored on the storage medium after the photographing start instruction to an external device according to said detecting means detecting that free space of a storage capacity of the storage medium is not enough during photographing of the moving image data, while said controlling means photographs the moving image;

receiving means for receiving the moving image data transmitted from said communicating means through the transmission line; and saving means for saving the moving image data received by said receiving means.

14. A system according to claim 13, wherein said controlling means further controls said communicating means so that said communicating means outputs a control signal for saving the moving image data transferred to the external device, as one file in case of transmission operation of moving image data, and wherein said saving means saves as one file the moving image data which is received according to the control signal by said receiving means.

15. A system according to claim 13, wherein said controlling means controls said storing means so that said storing means continues to store the moving image data obtained by said image pickup means even after starting the transmission of the moving image data.

16. A system according to claim 13, wherein said controlling means displays information for directing connection between the external device and said communicating means on a display device according to the output of said detecting means, in the case where said communicating means and said receiving means are not connected to each other through the transmission line.

17. A system according to claim 16, wherein said controlling means controls said image pickup means and said communicating means so that photographing is stopped without transmitting the moving image data to said receiving means, in the case where, even after said detecting means detects that free space of the storage capacity of the storage medium is not enough, said communicating means and said receiving means are not connected and the free space of said storing means has run out.

18. A system according to claim 13, wherein said controlling means displays information for showing that the transmission of the moving image data is started on the display device, according to said detecting means detecting that free space of the storage capacity of the storage medium is not enough.

19. An imaging method comprising:

an image pickup step;

a storing step of storing moving image data of a moving image photographed in said image pickup step on a storage medium according to the photographing start instruction;

a detecting step of detecting whether free space of a storage capacity of the storage medium is not enough;

a communicating step of transmitting the moving image data to an external device; and a controlling step of controlling said image pickup step and said communicating step according to said detecting step detecting that free space of the storage capacity of the storage medium is not enough during photographing of the moving image so as to start to transmit the moving image data of the moving image stored in said storing step after the photographing start instruction to the external device, while continuing photographing the moving image.

20. An imaging method comprising:

an image pickup step;

a memory writing and reading step of writing moving image data of a moving image photographed in said image pickup step in a memory according to a photographing start instruction and for reading out the moving image data from the memory;

a writing step of writing the moving image data in a storage device;

an detecting step of detecting whether free space of a storage capacity of the memory is not enough;

a communicating step of transmitting the moving image data stored in at least one of the memory and the storage device to an external device; and a controlling step of according to said detecting step detecting that free space of the storage capacity of the memory is not enough during photographing of the moving image data, starting to transmit the moving image data of the moving image stored in the memory after the photographing start instruction to the external device while photographing the moving image and switching writing of the moving image data output in said image pickup step from the memory to the storage device.

21. An image data processing method comprising:

an image pickup step;

a storing step of storing moving image data of a moving image photographed in said image pickup step on a storage medium according to a photographing start instruction;

a detecting step of detecting whether free space of a storage capacity of the storage medium is not enough;

a communicating step of transmitting the moving image data through a transmission line;

a controlling step of controlling said image pickup step and said communicating step to start transmission of the moving image data of the moving image stored in said storing step after the photographing start instruction to an external device according to said detecting step that the free space of the storage capacity of the storage medium is not enough during photographing of the moving image data, while said controlling step photographs the moving image;

a receiving step of receiving the moving image data transmitted in said communicating step through the transmission line; and a saving step of saving the moving image data received in said receiving step.

22. An imaging apparatus comprising:

image pickup means;

recording means for recording moving image data of a moving image photographed by said image pickup means on a recording medium according to a recording start instruction and for reading the moving image data from the recording medium, said recording means stopping recording the moving image data according to a recording stop instruction;

detecting means for detecting whether free space of a storage capacity of the recording medium is not enough;

communicating means for transmitting the moving image data to an external device; and controlling means for controlling said recording means and said communicating means according to said detecting means detecting that the free space of the storage capacity of the recording medium is not enough during recording the moving image data so as to start to read out, from the recording medium, the recorded moving image data being recorded after the recording start instruction and to transmit the read moving image data to the external device, while continuing recording the moving image data of the moving image on the recording medium, wherein said controlling means stops transmitting the moving image data to the external device after the moving image data recorded on the recording medium until a recording stop instruction is provided, and transmits a control signal to the external device to cause the external device to store the moving image data of the moving image photographed in a time period from the recording start instruction to the recording stop instruction.

* * * * *